United States Patent
Yamada

(10) Patent No.: US 10,074,043 B2
(45) Date of Patent: Sep. 11, 2018

(54) IMAGE FORMING APPARATUS CAPABLE OF CHANGING OPERATING STATE

(71) Applicant: Tomoaki Yamada, Toyokawa (JP)

(72) Inventor: Tomoaki Yamada, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 53 days.

(21) Appl. No.: 13/681,912

(22) Filed: Nov. 20, 2012

(65) Prior Publication Data
US 2013/0128298 A1    May 23, 2013

(30) Foreign Application Priority Data
Nov. 21, 2011   (JP) .................................. 2011-253487

(51) Int. Cl.
G06K 15/02    (2006.01)
G03G 15/00    (2006.01)
(Continued)

(52) U.S. Cl.
CPC ......... *G06K 15/02* (2013.01); *G03G 15/5004* (2013.01); *G06F 1/3231* (2013.01);
(Continued)

(58) Field of Classification Search
CPC ............... G06K 15/02; H04N 1/00496; H04N 1/00896; H04N 1/00501; G06F 3/011; G06F 3/017; G06F 1/3203; G06F 1/3218
See application file for complete search history.

(56) References Cited

U.S. PATENT DOCUMENTS

| | | | |
|---|---|---|---|
| 2005/0185216 A1* | 8/2005 | Mitsuhashi et al. | 358/1.15 |
| 2008/0123131 A1* | 5/2008 | Sawada | G03G 15/5016 358/1.15 |

(Continued)

FOREIGN PATENT DOCUMENTS

| | | |
|---|---|---|
| JP | 6-242226 A | 9/1994 |
| JP | 2002-071833 A | 3/2002 |

(Continued)

OTHER PUBLICATIONS

Tabata et al.; "Image Forming Apparatus"; JP Pub 2004-294700; JP Pub Date Mar. 26, 2004.*

(Continued)

*Primary Examiner* — Benny Q Tieu
*Assistant Examiner* — Haris Sabah
(74) *Attorney, Agent, or Firm* — Buchanan Ingersoll & Rooney PC

(57) ABSTRACT

An image forming apparatus can change an operating state between a normal mode and a power saving mode having power consumption lower than that of the normal mode. The image forming apparatus sets a detection range based on at least one of an angle of a manipulation panel, existence or non-existence of an output to the sheet discharge unit, and existence or non-existence of placement of the authentication device. The image forming apparatus detects an approach of a human body when the operating state is in the power saving mode. When a sensor detects that the human body approaches the detection range, the image forming apparatus returns the operating state from the power saving mode to the normal mode.

10 Claims, 19 Drawing Sheets

(51) Int. Cl.
  *G06K 15/00* (2006.01)
  *H04N 1/00* (2006.01)
  *G06F 1/32* (2006.01)

(52) U.S. Cl.
  CPC ......... *G06F 1/3284* (2013.01); *G06K 15/005* (2013.01); *G06K 15/406* (2013.01); *H04N 1/00323* (2013.01); *H04N 1/00496* (2013.01); *H04N 1/00896* (2013.01); *H04N 1/00912* (2013.01); *H04N 2201/0094* (2013.01); *Y02D 10/159* (2018.01); *Y02D 10/173* (2018.01)

(56) References Cited

U.S. PATENT DOCUMENTS

| | | | |
|---|---|---|---|
| 2008/0170258 A1* | 7/2008 | Yamamura | 358/1.15 |
| 2009/0232537 A1* | 9/2009 | Ogasawara | 399/81 |
| 2010/0150600 A1* | 6/2010 | Oyoshi | 399/88 |
| 2010/0231390 A1 | 9/2010 | Hashimoto | |
| 2010/0277762 A1* | 11/2010 | Eguchi | G03G 15/5016 358/1.15 |
| 2012/0075657 A1* | 3/2012 | Yamamoto | 358/1.14 |
| 2012/0212510 A1* | 8/2012 | Hewitt et al. | 345/650 |

FOREIGN PATENT DOCUMENTS

| | | | |
|---|---|---|---|
| JP | 2004294700 | * | 3/2004 |
| JP | 2010-217303 A | | 9/2010 |
| JP | 2011-203614 A | | 10/2011 |
| JP | 2013-7847 A | | 1/2013 |

OTHER PUBLICATIONS

Japanese Office Action (Notice of Grounds of Rejection) dated Nov. 12, 2013, issued by the Japanese Patent Office in corresponding Japanese Patent Application No. 2011-253487, and English language translation of Office Action. (5 pages).

* cited by examiner

FIG.11

|  |  | DETECTING DISTANCE OF ANTENNA A | | | | | |
|---|---|---|---|---|---|---|---|
|  |  | A1 | A2 | A3 | A4 | A5 | A6 |
| DETECTING DISTANCE OF ANTENNA B | B1 | O | — | — | — | — | — |
|  | B2 | O | O | — | — | — | — |
|  | B3 | O | O | O | — | — | — |
|  | B4 | O | O | O | O | — | — |
|  | B5 | O | O | O | O | O | — |
|  | B6 | O | O | O | O | O | O |

O WITHIN DETECTION RANGE
— OUTSIDE OF DETECTION RANGE

FIG.13

|  |  | DETECTING DISTANCE OF ANTENNA A |  |  |  |  |  |
|---|---|---|---|---|---|---|---|
|  |  | A1 | A2 | A3 | A4 | A5 | A6 |
| DETECTING DISTANCE OF ANTENNA B | B1 | — | — | — | — | — | — |
|  | B2 | ○ | — | — | — | — | — |
|  | B3 | ○ | ○ | — | — | — | — |
|  | B4 | ○ | ○ | ○ | — | — | — |
|  | B5 | ○ | ○ | ○ | ○ | — | — |
|  | B6 | ○ | ○ | ○ | ○ | ○ | — |

○ WITHIN DETECTION RANGE
— OUTSIDE OF DETECTION RANGE

FIG.14

|  |  | DETECTING DISTANCE OF ANTENNA A | | |
|---|---|---|---|---|
|  |  | D1~D2 | D2~D3 | D3~D4 |
| DETECTING DISTANCE OF ANTENNA B | D11~D12 | ◯ | — | — |
|  | D12~D13 | ◯ | ◯ | — |
|  | D13~D14 | ◯ | ◯ | ◯ |

◯ WITHIN DETECTION RANGE
— OUTSIDE OF DETECTION RANGE

FIG.16

|  |  | DETECTING DISTANCE OF ANTENNA 131 | | | | |
|---|---|---|---|---|---|---|
|  |  | A1 | A2 | A3 | A4 | A5 |
| DETECTING DISTANCE OF ANTENNA 132 | B1 | ○ | — | — | — | — |
|  | B2 | ○ | ○ | — | — | — |
|  | B3 | ○ | ○ | ○ | — | — |
|  | B4 | ○ | ○ | ○ | ○ | — |
|  | B5 | ○ | ○ | ○ | ○ | ○ |

○ WITHIN DETECTION RANGE
— OUTSIDE OF DETECTION RANGE

FIG.18

|  |  | DETECTING DISTANCE OF ANTENNA 191 | | |
|---|---|---|---|---|
|  |  | A1 | A2 | A3 |
| DETECTING DISTANCE OF ANTENNA 192 | B1 | O | — | — |
|  | B2 | O | O | — |
|  | B3 | O | O | O |

O  WITHIN DETECTION RANGE

—  OUTSIDE OF DETECTION RANGE

IMAGE FORMING APPARATUS CAPABLE OF CHANGING OPERATING STATE

This application is based on Japanese Patent Application No. 2011-253487 filed with the Japan Patent Office on Nov. 21, 2011, the entire content of which is hereby incorporated by reference.

BACKGROUND OF THE INVENTION

Field of the Invention

The present invention relates to an image forming apparatus capable of changing an operating state, particularly to an image forming apparatus capable of changing an operating state between a normal mode and a power saving mode having power consumption lower than that of the normal mode.

Description of the Background Art

Examples of an electrophotographic image forming apparatus in which an image is formed by an electrophotographic system include an MFP (Multi Function Peripheral) having a scanner function, a facsimile function, a copying function, a function as a printer, a data communication function, and a server function, a facsimile machine, a copying machine, and a printer.

In a general image forming process where the electrophotographic system is adopted, a color (multi-color) image is formed on a recording sheet by the following method. A toner image is formed on a surface of an image bearing member by an electrostatic recording method, and the toner image is transferred to an intermediate transfer member and conveyed to a transfer unit. The transfer unit electrostatically transfers the toner image on the intermediate transfer member to a sheet that is conveyed from a sheet feed tray by a sheet conveying unit. Then the sheet is conveyed to a fixing device, and the toner image is fixed to the sheet by application of heat and pressure to the sheet. The sheet conveying unit discharges the sheet, to which the toner image is fixed, to a discharge tray.

In the case where office equipment, such as an MFP, particularly an image forming apparatus is not used for a long period of time, power feeding is partially turned off to cause an operating state of the image forming apparatus to transition to a power saving mode having low power consumption. On the other hand, in the case where a job is received or the image forming apparatus is manipulated, the image forming apparatus releases the power saving mode to transition to a normal mode. In the power saving mode, it is necessary that the power be fed to a CPU (Central Processing Unit) of a manipulation unit in order to detect an instruction to release the power saving mode, which is performed by a key manipulation of the manipulation unit of the image forming apparatus.

In order to further reduce the power consumption of the image forming apparatus, it is preferred that the power feeding be stopped in the power saving mode for the unit that detects the reception of the job or the manipulation of the image forming apparatus. Therefore, there is proposed a technology in which, in order to release the power saving mode (return the image forming apparatus from the power saving mode to the normal mode) without passing a current through the CPU of the manipulation unit, a human body of user who approaches the image forming apparatus is detected by low-power-consumption human body sensors, such as an infrared sensor and an electrostatic capacitance sensor, and the power saving mode of the image forming apparatus is released according to a human body detection signal of the human body sensor. In the technology, the image forming apparatus can return from the power saving mode even in a state where the CPU of the manipulation unit is turned off.

However, in the case where the human body detection signal of the human body sensor is used, there is a problem that the human body sensor is likely to falsely detect the human body to degrade reliability of the release of the power saving mode. For example, in an office where many persons exist, frequently the image forming apparatus is placed in a pathway of the office. In such cases, even when the person merely passes by in front of the MFP without using the MFP, sometimes the human body sensor falsely detects the human body and the image forming apparatus releases the power saving mode.

A manipulation panel for displaying information for the user and receiving the manipulation from the user is provided in image forming apparatuses, such as the MFP. Because an angle of the manipulation panel can be changed, sometimes the manipulation panel projects from the image forming apparatus depending on the angle. In the conventional image forming apparatus that releases the power saving mode using the human body detection signal of the human body sensor, in the case where the manipulation panel projects from the image forming apparatus, even if the person passes by in front of the image forming apparatus without touching the manipulation panel, sometimes the human body sensor detects the approach of the human body to release the power saving mode.

In order to prevent the problem, for example, it is conceivable that a detection sensitivity of the human body sensor is decreased to detect the human body only when the human body is located extremely close to the human body sensor. However, in this case, convenience is degraded for the user who wants to release the power saving mode as quickly as possible.

Document 1 below discloses a technology of being able to prevent the unintentional release of the power saving mode to some extent. In the technology disclosed in Document 1, the human body sensor that is driven in a time-sharing manner detects the human body, and a determination that the human body exists is made to release the power saving mode in the case where the human body sensor continuously outputs the human body detection signal for a specified time interval. Document 1: Japanese Patent Publication Laying-Open No. 2002-71833

According to the technology of Document 1, the false detection caused by the temporary approach of the human body to the image forming apparatus or the passage of the human body in front of the image forming apparatus can be prevented to some extent. However, there is a problem that the low reliability of the release of the power saving mode remains in the technology of Document 1. In the technology of Document 1, the human body sensor continuously outputs the human body detection signal for the specific time interval to release the power saving mode in the case where the person who has no intention to use the image forming apparatus stands in front of the image forming apparatus for the purpose of checking a document or chatting with another person. Desirably, the human body is not detected when the person merely stands in front of the image forming apparatus, but the human body is quickly detected when the human body of the user approaches the image forming apparatus in order to manipulate the image forming apparatus.

An angle at which a manipulation finger of the user approaches the manipulation panel changes depending on the angle of the manipulation panel. Accordingly, a range where the manipulation finger of the user is detected also changes according to the angle of the manipulation panel. However, in the conventional technology, because the detection range is set irrespective of the angle of the manipulation panel, sometimes the human body of the person who has nothing to do with the manipulation of the image forming apparatus is falsely detected.

SUMMARY OF THE INVENTION

An object of the present invention is to provide an image forming apparatus capable of improving the reliability of the release of the power saving mode.

In accordance with one aspect of the present invention, an image forming apparatus capable of changing an operating state between a normal mode and a power saving mode having power consumption lower than that of the normal mode, the image forming apparatus includes: a setting unit to set a detection range based on at least one of an angle of a manipulation panel of the image forming apparatus, existence or non-existence of an output to a sheet discharge unit of the image forming apparatus, and existence or non-existence of placement of an authentication device in the image forming apparatus; a human body detector to detect an approach of a human body when the operating state of the image forming apparatus is in the power saving mode; and a return unit to return the operating state of the image forming apparatus from the power saving mode to the normal mode when the human body detector detects that the human body approaches the detection range.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a view schematically illustrating a first human body detecting distance table.

FIG. 13 is a view schematically illustrating a second human body detecting distance table.

FIG. 14 is a view schematically illustrating a third human body detecting distance table.

FIG. 16 is a view schematically illustrating a fourth human body detecting distance table.

FIG. 18 is a view schematically illustrating a fifth human body detecting distance table.

DESCRIPTION OF THE PREFERRED EMBODIMENTS

Hereinafter, an embodiment of the present invention will be described with reference to the drawings.

In the present embodiment, an image forming apparatus forms an image by an electrophotographic system or an electrostatic recording system. By way of the example, the image forming apparatus may be an MFP having a scanner function, a facsimile function, a copying function, a function as a printer, a data communication function, and a server function, a facsimile machine, a copying machine, or printers.

[Configuration of Image Forming Apparatus]

First, a configuration of the image forming apparatus of the present embodiment will be described below.

Figure 1:
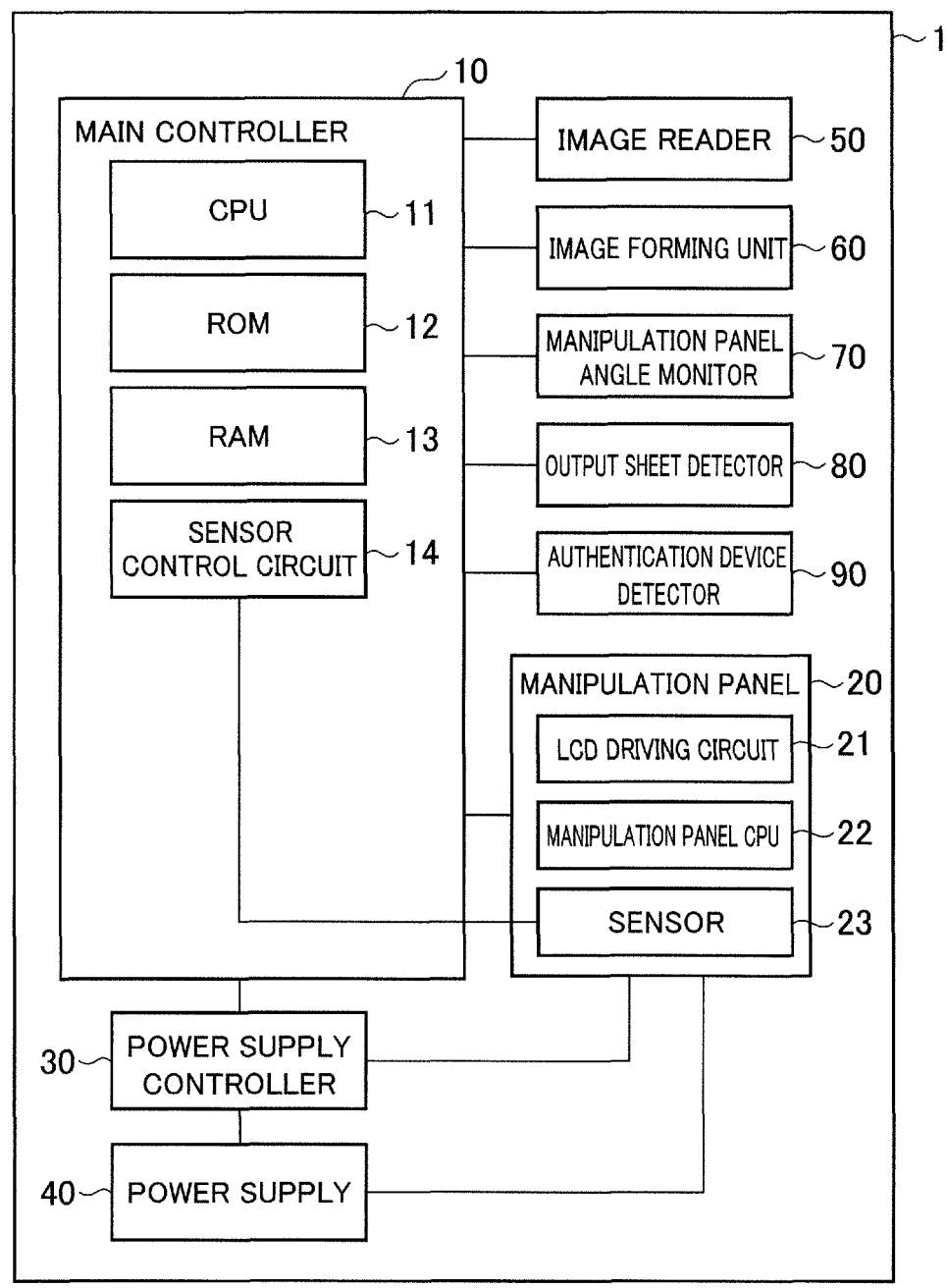
FIG. 1 is a block diagram schematically illustrating a configuration of a copying machine 1 according to an embodiment of the present invention.

Referring to FIG. 1, a copying machine 1 (digital multi function peripheral) that is the image forming apparatus of the present embodiment includes a main controller 10, a manipulation panel 20, a power supply controller 30, a power supply 40, an image reader 50, an image forming unit 60, a manipulation panel angle monitor 70, an output sheet detector (sheet discharge port monitor) 80, and an authentication device detector 90.

Main controller 10 collectively controls each unit of copying machine 1. Main controller 10 includes a CPU 11 that executes various control programs, a ROM (Read Only Memory) 12 in which a control program to control an operation of copying machine 1 is stored, a RAM (Random Access Memory) 13 that is a working memory of CPU 11, and a sensor control circuit 14 that controls sensitivity of a sensor 23.

Manipulation panel 20 includes an LCD (Liquid Crystal Display) driving circuit 21, a manipulation panel CPU 22, and sensor 23. LCD driving circuit 21 drives an LCD screen of a touch panel 25 (see FIG. 2) under the control of manipulation panel CPU 22. Manipulation panel CPU 22 controls the operation of manipulation panel 20 based on an instruction from main controller 10. For example, sensor 23 is a semiconductor control sensor. In the case where an operating state of copying machine 1 is in a power saving mode, sensor 23 detects (senses) an approach of a human body in a noncontact manner. Sensor 23 is connected to sensor control circuit 14.

Image reader 50 performs processing of reading a document on a document holder. Image forming unit 60 performs image forming processing based on image data read by image reader 50. Manipulation panel angle monitor 70 is attached to a hinge H (see FIG. 2) for changing an angle θ of manipulation panel 20 to monitor the angle of the manipulation panel. Output sheet detector 80 detects existence or non-existence of an output to a sheet discharge unit 135 (see FIG. 15) of copying machine 1. Authentication device detector 90 detects whether an authentication device 195 (see FIG. 17) is placed in copying machine 1.

Power supply controller 30 controls power feeding from power supply 40 to such units of copying machine 1 as LCD driving circuit 21 and manipulation panel CPU 22. Power supply controller 30 can change the operating state (a controls state of power supply controller 30) of copying machine 1 between a normal mode and a power saving mode having power consumption lower than that of the normal mode. The power is fed to all circuits in the normal mode, and the power feeding to some circuits is stopped in the power saving mode. The power is fed to main controller 10 from power supply 40 even in the power saving mode.

When a state, in which a job to be processed does not exist while a user manipulation is not performed, continues for at least a predetermined time, in order to reduce the power consumption, main controller 10 controls power supply controller 30 to cause the operating state of copying machine 1 to transition from the normal mode to the power saving mode. During the transition to the power saving mode, main controller 10 adjusts antenna sensitivity (detection range) of sensor 23 by angle θ of manipulation panel 20 monitored by manipulation panel angle monitor 70.

Figure 2:
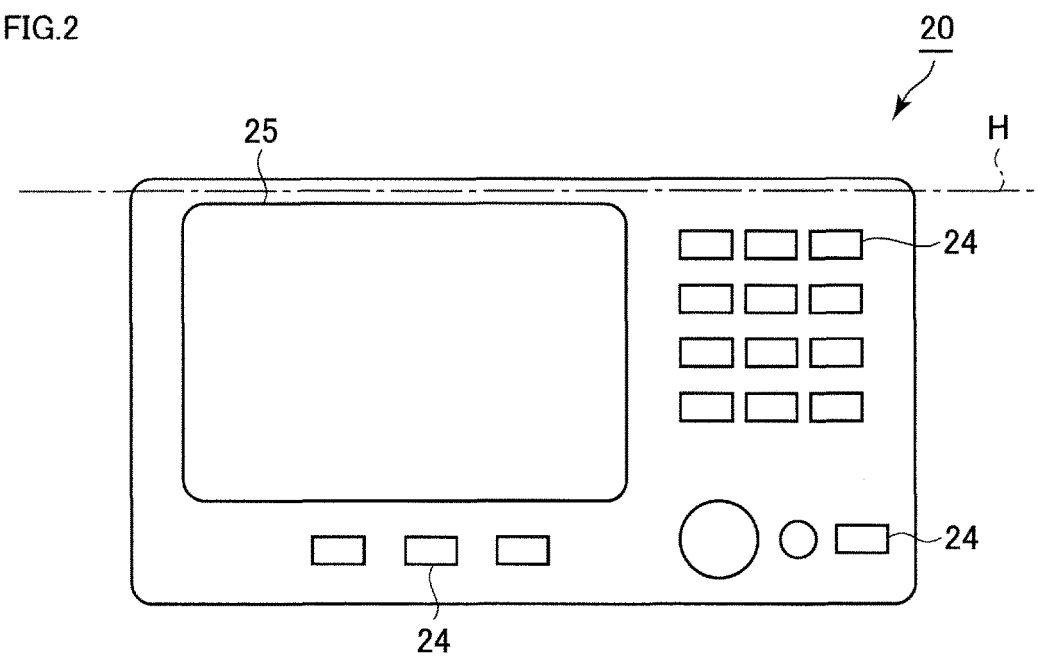
FIG. 2 is a view schematically illustrating a configuration of an appearance of a manipulation panel 20.

FIG. 2 is a view schematically illustrating a configuration of an appearance of manipulation panel 20.

Referring to FIG. 2, manipulation panel 20 includes various manipulation keys 24 and touch panel 25. Manipulation key 24 includes a numerical keypad, a start key, a function setting key and the like. Touch panel 25 has a display function of displaying a setting content or an operating state of copying machine 1 and an input receiving function of receiving a user input through touch panel 25.

On a backside (a surface on an opposite side to a surface in FIG. 2), manipulation panel 20 is fixed to a main body (apparatus body) of copying machine 1 with hinge H interposed therebetween. Therefore, angle θ of manipulation panel 20 can be changed.

Figure 3:
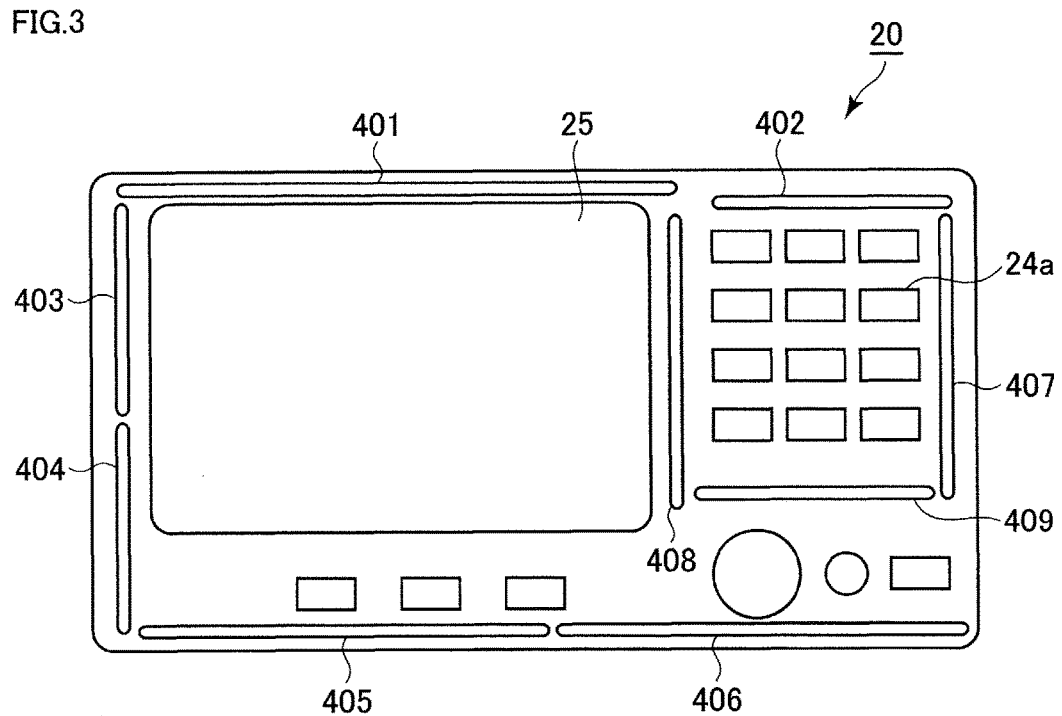
FIG. 3 is a view schematically illustrating a position of an antenna mounted on manipulation panel 20.

FIG. 3 is a view schematically illustrating a position of the antenna mounted on manipulation panel 20.

Referring to FIG. 3, sensor 23 includes a plurality of rod-shaped antennas (sensor antennas and human body sensors) 401 to 409 disposed at positions different from each other in manipulation panel 20. For example, antennas 401 to 409 are electrostatic capacitance sensors disposed so as to surround an outer periphery of the surface (the surface in FIG. 3) of manipulation panel 20. In an upper portion of manipulation panel 20 in FIG. 3, antennas 401 and 402 extend in a horizontal direction. In a left portion of manipulation panel 20 in FIG. 3, antennas 403 and 404 extend in a vertical direction. In a lower portion of manipulation panel 20 in FIG. 3, antennas 405 and 406 extend in the horizontal direction. In a right portion of manipulation panel 20 in FIG. 3, antenna 407 extends in the vertical direction. Antennas 402 and 407 to 409 are disposed so as to surround an outer periphery of a numerical keypad 24a that is one of manipulation keys 24. In the upper portion of numerical keypad 24a in FIG. 3, antenna 402 extends in the horizontal direction. In the right portion of numerical keypad 24a in FIG. 3, antenna 407 extends in the vertical direction. In the left portion of numerical keypad 24a in FIG. 3, antenna 408 extends in the vertical direction. In the lower portion of numerical keypad 24a in FIG. 3, antenna 409 extends in the horizontal direction.

As illustrated in FIG. 3, antennas 401 to 409 are disposed around touch panel 25 and manipulation key 24, which allows sensor 23 to detect a manipulation finger of the user who manipulates touch panel 25 and manipulation key 24. For example, sensor 23 is an electrostatic capacitance sensor. Sensor 23 detects the approach of the manipulation finger of the user to antennas 401 to 409 based on a change in electrostatic capacitance between the manipulation finger of the user and antennas 401 to 409. It is to be noted that the positions and the number of antennas 401 to 409 are illustrated in FIG. 3 by way of example, but there is no limitation to the positions and the number of antennas 401 to 409.

Figure 4:
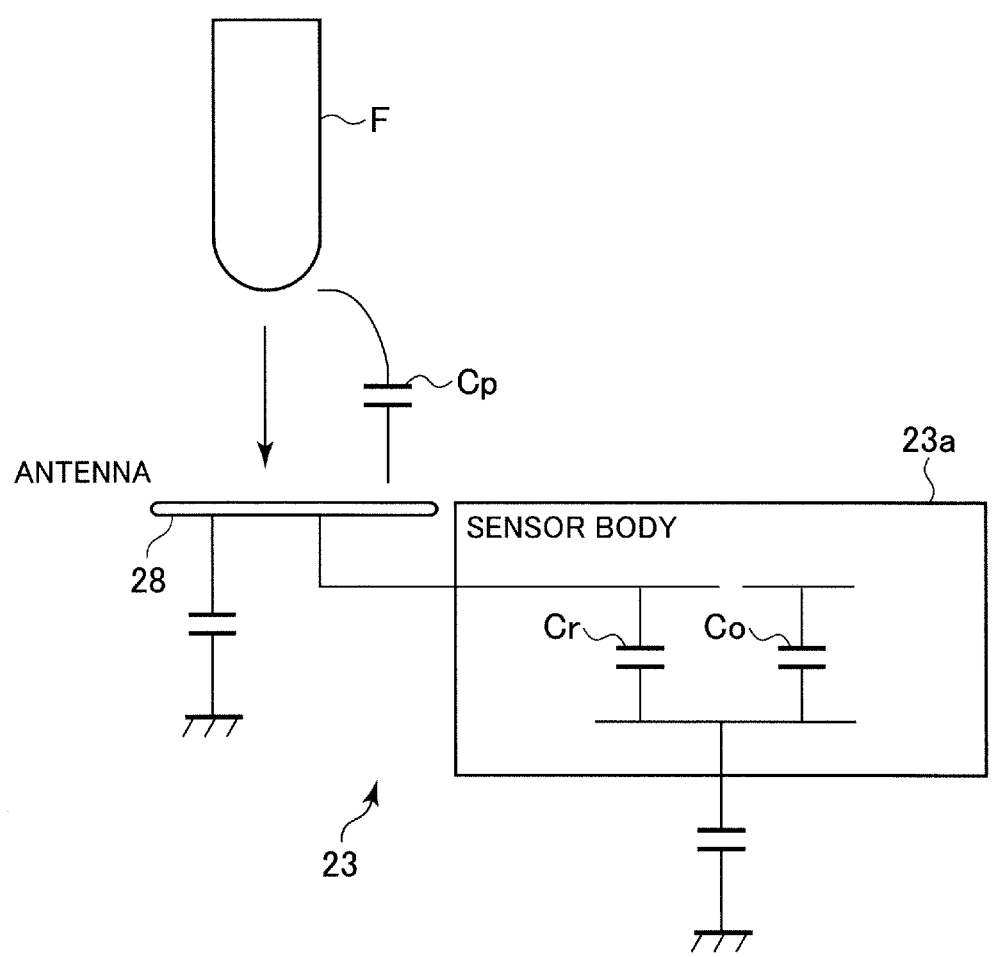
FIG. 4 is a view illustrating a principle of an electrostatic capacitance sensor.

FIG. 4 is a view illustrating a principle of the electrostatic capacitance sensor.

Referring to FIG. 4, sensor 23 includes a sensor body 23a and an antenna 28. Antenna 28 corresponds to each of antennas 401 to 409 in FIG. 3. Antenna 28 is connected to sensor body 23a. Sensor body 23a has a detection capacitance Cr and a reference capacitance Co therein. Antenna 28 constitutes a capacitance Cp (finger-antenna capacitance Cp) with a manipulation finger F of the user. Capacitance Cp increases when manipulation finger F approaches antenna 28. Sensor body 23a detects the approach of the manipulation finger by monitoring a change of a difference ΔC (=Cr+Cp−Co) between a sum of detection capacitance Cr and capacitance Cp and reference capacitance Co. Sensor control circuit 14 can set the sensitivity of antenna 28 by adjusting each of detection capacitance Cr and reference capacitance Co.

It is to be noted that an infrared sensor may be used in addition to the electrostatic capacitance sensor 23.

[Outline of Operation of Image Forming Apparatus During Transition to Power Saving Mode and Return from Power Saving Mode]

An outline of operation of image forming apparatus during a transition to the power saving mode and a return from the power saving mode will be described below.

When the operating state of copying machine 1 transitions from the normal mode to the power saving mode, main controller 10 sets a detection range of the human body based on the state of copying machine 1. Specifically, main controller 10 sets the detection range based on at least one of angle θ of manipulation panel 20, the existence or non-existence of the output to the sheet discharge unit of copying machine 1, and the existence or non-existence of the placement of the authentication device in copying machine 1.

Main controller 10 sets the detection range by the sensitivity of each of antennas 401 to 409 and a kind of a human body detecting distance table used.

When sensor 23 detects that the human body approaches the detection range set by main controller 10, main controller 10 returns the operating state of copying machine 1 from the power saving mode to the normal mode. When manipulation panel CPU 22 detects that manipulation panel 20 is manipulated, main controller 10 returns the operating state of copying machine 1 from the power saving mode to the normal mode.

Figure 5:
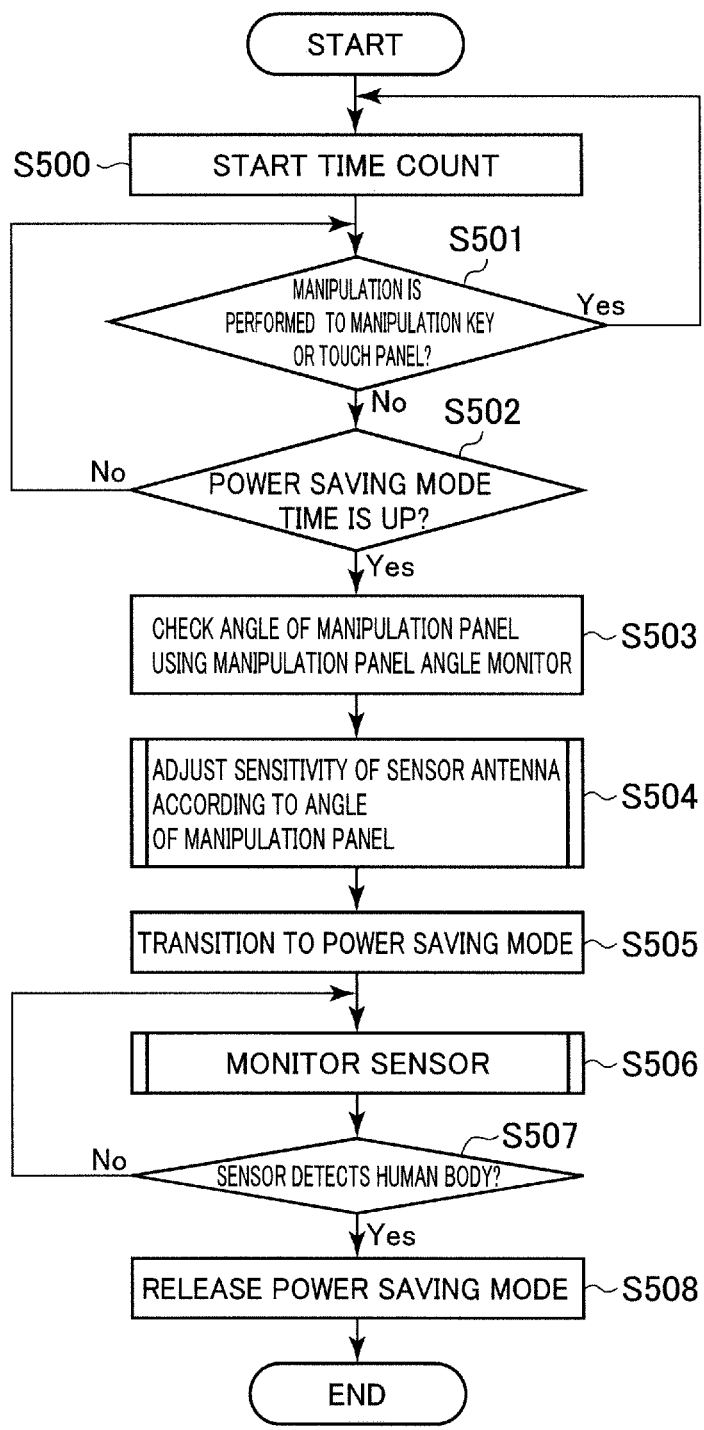
FIG. 5 is a control flowchart of a transition to a power saving mode and a return from the power saving mode in an embodiment of the present invention.

FIG. 5 is a control flowchart of the transition to the power saving mode and the return from power saving mode in an embodiment of the present invention.

Referring to FIG. 5, after the normal mode is started up, main controller 10 starts a time count of a time necessary to transition to a previously-set power saving mode (S500), and main controller 10 determines whether the manipulation is performed to various manipulation keys 24 or touch panel 25 of manipulation panel 20 (S501).

When the manipulation is performed (Yes in S501), main controller 10 proceeds to the processing in S500. On the other hand, when the manipulation is not performed (No in S501), main controller 10 determines whether the time necessary to transition to the power saving mode is up (S502).

When the time necessary to transition to the power saving mode is up (Yes in S502), main controller 10 checks angle $\theta$ of manipulation panel 20 using manipulation panel angle monitor 70 (S503). Subsequently, main controller 10 adjusts the sensitivity of each of antennas 401 to 409 according to angle $\theta$ (S504), and main controller 10 proceeds to processing in S505. On the other hand, when the time necessary to transition to the power saving mode is not up (No in S502), main controller 10 proceeds to the processing in S501.

In step S505, main controller 10 controls power supply controller 30 to cause the operating state of copying machine 1 to transition to the power saving mode (S505), and main controller 10 monitors sensor 23 (S506). Main controller 10 determines whether sensor 23 detects the human body (S507).

In step S507, when sensor 23 detects the human body (Yes in S507), main controller 10 releases the power saving mode to return the operating state of copying machine 1 to the normal mode (S508), and main controller 10 ends the processing. On the other hand, when sensor 23 does not detect the human body (No in S507), main controller 10 goes to the processing in S506.

[Antenna Sensitivity Setting Method]

Next, an antenna sensitivity setting method performed by main controller 10 during the transition to the power saving mode will be described below.

When the operating state of copying machine 1 is caused to transition from the normal mode to the power saving mode, main controller 10 may set the sensitivity of each of antennas 401 to 409 based on angle $\theta$ of manipulation panel 20.

Figure 6:
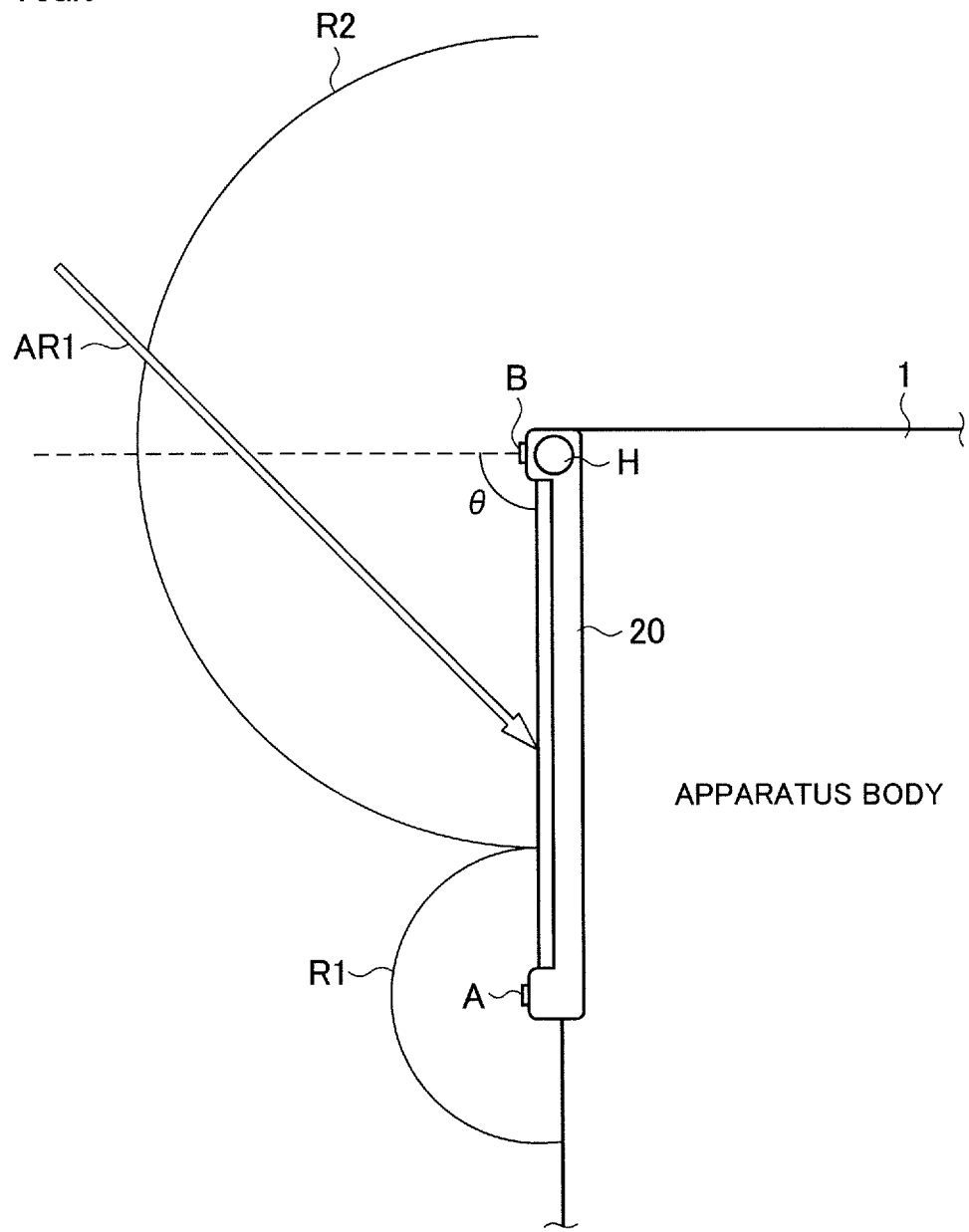
FIG. 6 is a view schematically illustrating detection ranges of antennas A and B and an approach direction of a manipulation finger when manipulation panel 20 has an angle θ of 90 degrees.

FIG. 6 is a view schematically illustrating the detection ranges of antennas A and B and an approach direction of the manipulation finger when manipulation panel 20 has angle $\theta$ of 90 degrees. Hereinafter, it is to be noted that an antenna that corresponds to antennas 401 and 402 provided in the upper portion of manipulation panel 20 in FIG. 3 may be referred to as an antenna B, and an antenna that corresponds to antennas 405 and 406 provided in the lower portion of manipulation panel 20 in FIG. 3 may be referred to as an antenna A.

Referring to FIG. 6, angle $\theta$ of manipulation panel 20 is defined as an angle formed between a horizontal plane (horizontal direction) and a direction in which the surface of manipulation panel 20 extends. In FIG. 6, hinge H extends in the direction perpendicular to a paper surface, and angle $\theta$ is 90 degrees. Angle $\theta$ of manipulation panel 20 can be changed in a range of 0 degree to 90 degrees. In the case where manipulation panel 20 has angle $\theta$ of 90 degrees (manipulation panel 20 is in the perpendicular state), the manipulation finger of the user usually approaches manipulation panel 20 along the direction indicated by an arrow AR1, and the human body of the user is detected in a range (hereinafter sometimes referred to as a detectable range) R2 where antenna B can detect the distance. Because there is a low possibility of detecting the human body of the user in a detectable range R1 of antenna A, antenna A easily generates false detection when detectable range R1 becomes wider. Accordingly, in the case where manipulation panel 20 has angle $\theta$ of 90 degrees, main controller 10 decreases the sensitivity of other antennas including antenna A while locally increasing the sensitivity of antenna B, so that the false detection of antenna A is prevented.

Figure 7:
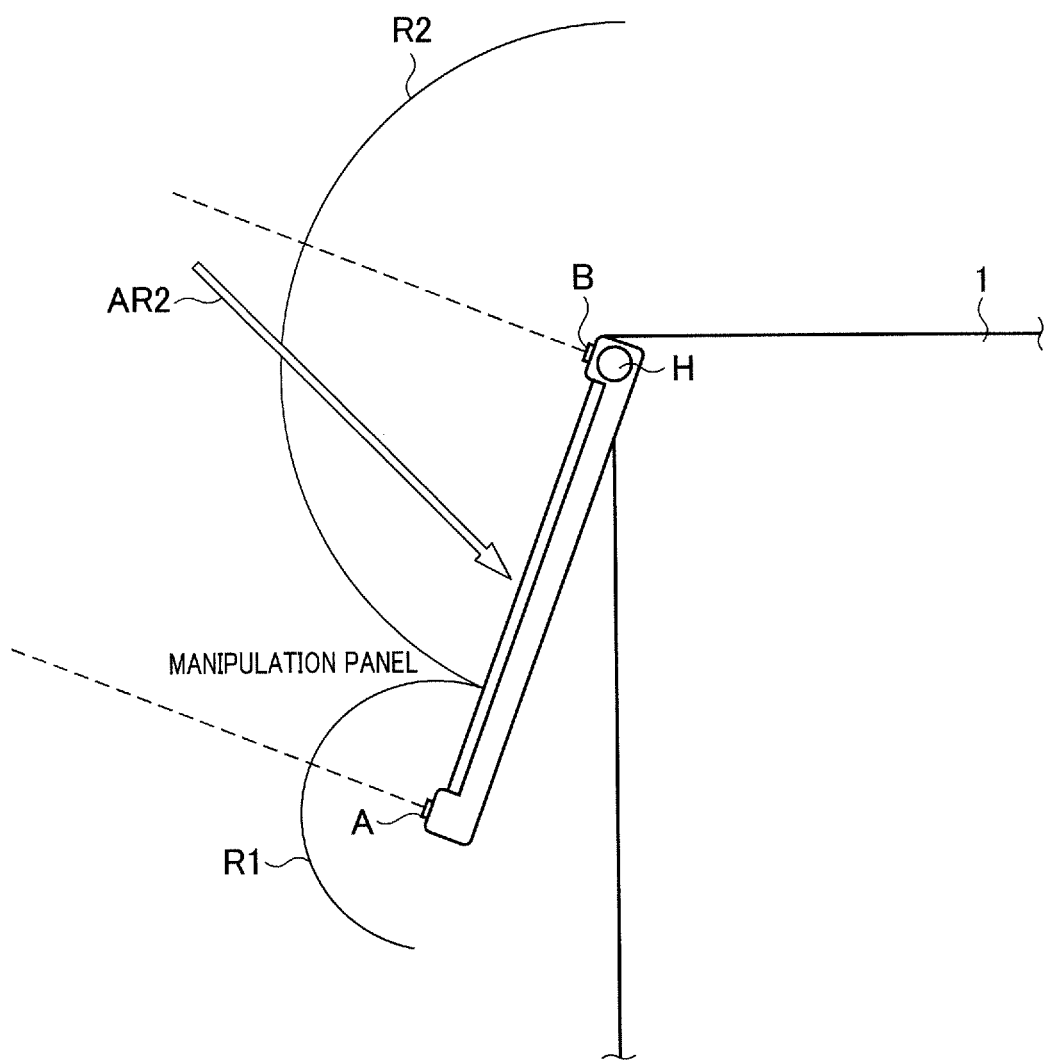
FIG. 7 is a view schematically illustrating the detection ranges of the antennas A and B and the approach direction of the manipulation finger when manipulation panel 20 has angles θ of 46 degrees to 89 degrees.

FIG. 7 is a view schematically illustrating the detection ranges of antennas A and B and the approach direction of the manipulation finger when manipulation panel 20 has angles $\theta$ of 46 degrees to 89 degrees.

Referring to FIG. 7, in the case where manipulation panel 20 has angles $\theta$ of 46 degrees to 89 degrees, the manipulation finger of the user usually approaches manipulation panel 20 along the direction indicated by an arrow AR2, and the human body of the user is detected on a slightly lower side (a central portion of manipulation panel 20) in detectable range R2 of antenna B. Because there is the low possibility of detecting the human body of the user in detectable range R1 of antenna A, antenna A easily generates the false detection when detectable range R1 becomes wider. Accordingly, in the case where manipulation panel 20 has angles $\theta$ of 46 degrees to 89 degrees, main controller 10 increases the sensitivity of the antenna located between (the central portion of manipulation panel 20) antennas A and B compared with the case that manipulation panel 20 has angle $\theta$ of 90 degrees. The sensitivity of antenna A remains decreased to prevent the false detection of antenna A.

Figure 8:
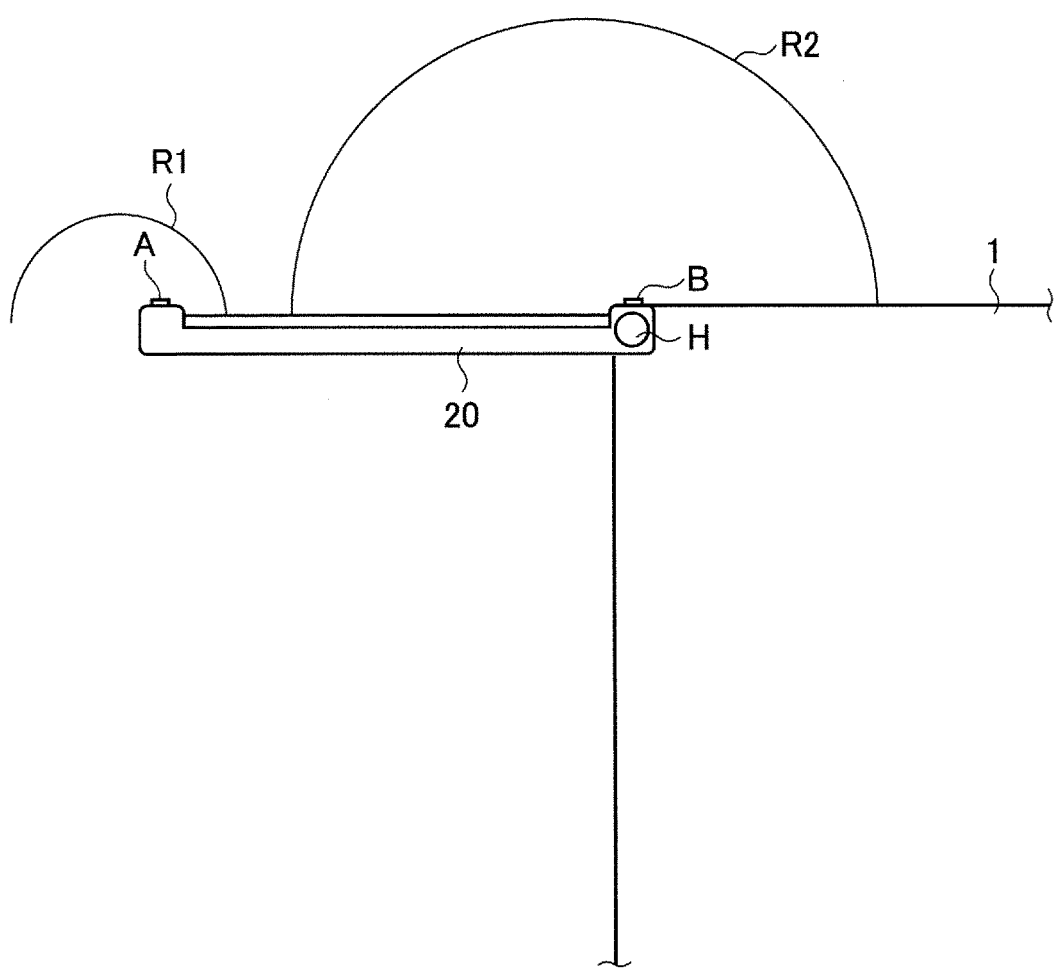
FIG. 8 is a view schematically illustrating the detection ranges of the antennas A and B and the approach direction of the manipulation finger when manipulation panel 20 has the angle θ of 0 degree.

FIG. 8 is a view schematically illustrating the detection ranges of antennas A and B and the approach direction of the manipulation finger when manipulation panel 20 has angle $\theta$ of 0 degree.

Referring to FIG. 8, in the case where manipulation panel 20 has angle $\theta$ of 0 degree (manipulation panel 20 is in the horizontal state, or the display surface of manipulation panel 20 is horizontal), the lower portion of manipulation panel 20 projects toward a pathway side (an outside of copying machine 1), and detectable range R1 of antenna A hangs over the pathway side. Therefore, when detectable range R1 becomes wider, there is a high possibility of falsely detecting the human body that passes by the neighborhood of copying machine 1. Accordingly, in the case where manipulation panel 20 has angle $\theta$ of 0 degree, main controller 10 locally decreases the sensitivity of antenna A.

Figure 9:
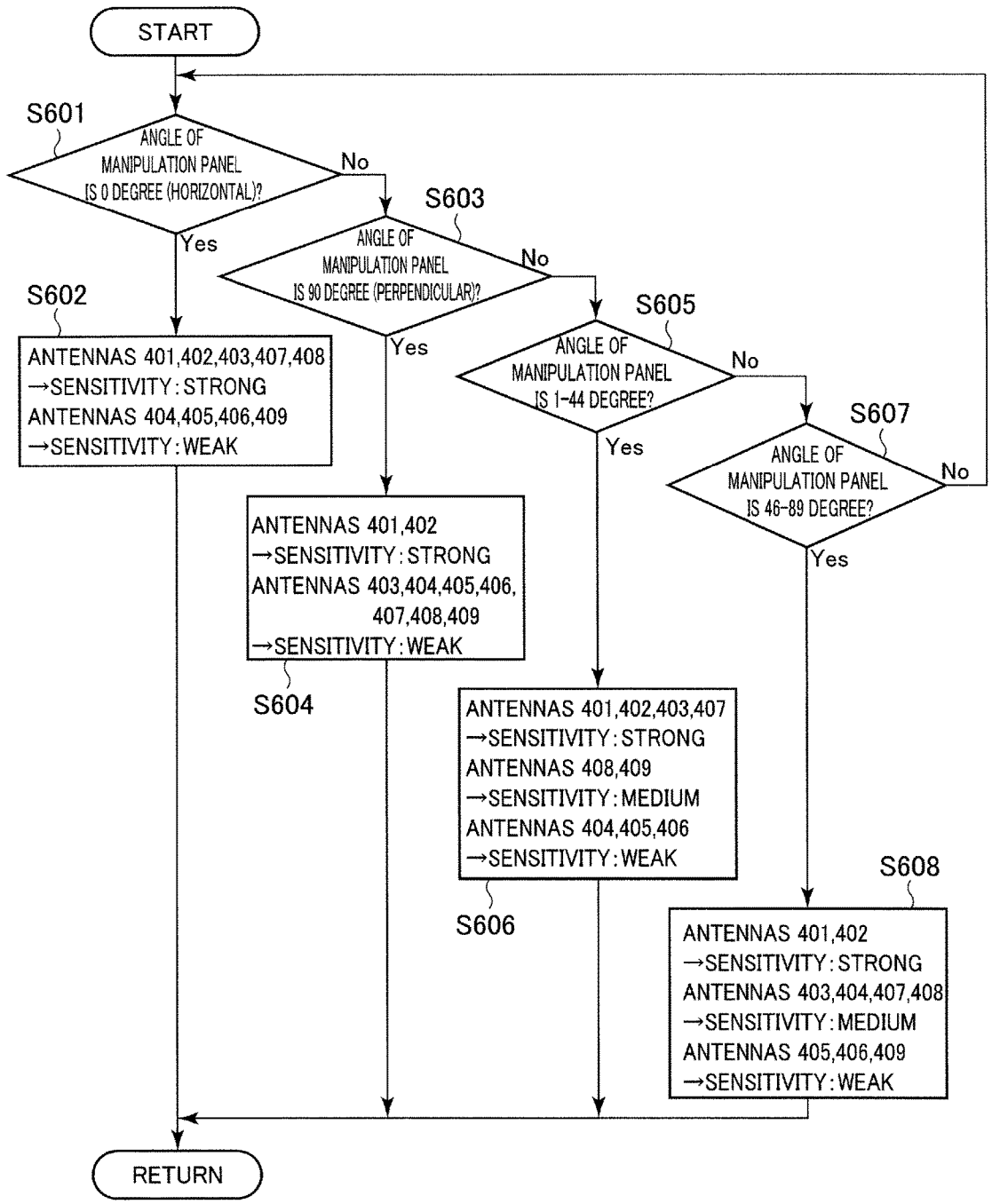
FIG. 9 is a view of a subroutine of processing in S504 in FIG. 5.

FIG. 9 is a view of a subroutine of the processing in S504 in FIG. 5.

Referring to FIG. 9, in the processing of adjusting the sensitivity of antennas 401 to 409 (S504), main controller 10 determines whether manipulation panel 20 has angle $\theta$ of 0 degree (the horizontal state) (S601).

When manipulation panel 20 has angle $\theta$ of 0 degree (Yes in S601), main controller 10 locally decreases the sensitivity of the antenna (antenna A) in the lower portion of manipulation panel 20. Specifically, main controller 10 sets the sensitivity of each of antennas 401, 402, 403, 407, and 408 to strong, and sets the sensitivity of each of antennas 404, 405, 406, and 409 to weak (S602). Then main controller 10 returns to a main routine. On the other hand, when manipulation panel 20 does not have angle $\theta$ of 0 degree (No in S601), main controller 10 determines whether manipulation panel 20 has angle $\theta$ of 90 degrees (the perpendicular state) (S603).

When manipulation panel 20 has angle $\theta$ of 90 degrees (Yes in S603), main controller 10 locally increases the sensitivity of the antenna (antenna B) in the upper portion of manipulation panel 20. Specifically, main controller 10 sets the sensitivity of each of antennas 401 and 402 to strong, and sets the sensitivity of each of antennas 403, 404, 405, 406, 407, 408, and 409 to weak (S604). Then main controller 10 returns to the main routine. On the other hand, when manipulation panel 20 does not have angle θ of 90 degrees (No in S603), main controller 10 determines whether manipulation panel 20 has angles θ of 1 degree to 44 degrees (S605).

When manipulation panel 20 has angles θ of 1 degree to 44 degrees (Yes in S605), main controller 10 decreases the sensitivity of the antenna in the central portion of manipulation panel 20 compared with the case where manipulation panel 20 has angle θ of 0 degree. Specifically, main controller 10 sets the sensitivity of each of antennas 401, 402, 403, and 407 to strong, sets the sensitivity of each of antennas 408 and 409 to medium, and sets the sensitivity of each of antennas 404, 405, and 406 to weak (S606). Then main controller 10 returns to the main routine. On the other hand, when manipulation panel 20 has angles θ of 1 degree to 44 degrees (No in S605), main controller 10 determines whether manipulation panel has angles θ of 46 degrees to 89 degrees (S607).

When manipulation panel 20 has angles θ of 46 degree to 89 degrees (Yes in S607), main controller 10 increases the sensitivity of the antenna in the central portion of manipulation panel 20 compared with the case where manipulation panel 20 has angle θ of 90 degrees. Specifically, main controller 10 sets the sensitivity of each of antennas 401 and 402 to strong, sets the sensitivity of each of antennas 403, 404, 407, and 408 to medium, and sets the sensitivity of each of antennas 405, 406, and 409 to weak (S608). Then main controller 10 returns to the main routine. On the other hand, when manipulation panel 20 does not have angles θ of 46 degree to 89 degrees (No in S607), main controller 10 proceeds to the processing in S601.

The method for setting (adjusting) the sensitivity of each of antennas 401 to 409 is not limited to the present embodiment. The sensitivity of each of antennas 401 to 409 may be decided based on another condition (for example, the existence or non-existence of the output to sheet discharge unit 135 (see FIG. 15) and the existence or non-existence of the placement of authentication device 195 (see FIG. 17) in copying machine 1) in addition to angle θ of manipulation panel 20.

[Human Body Detecting Method]

Next, a human body detecting method performed by sensor 23 in the power saving mode will be described below.

Figure 10:
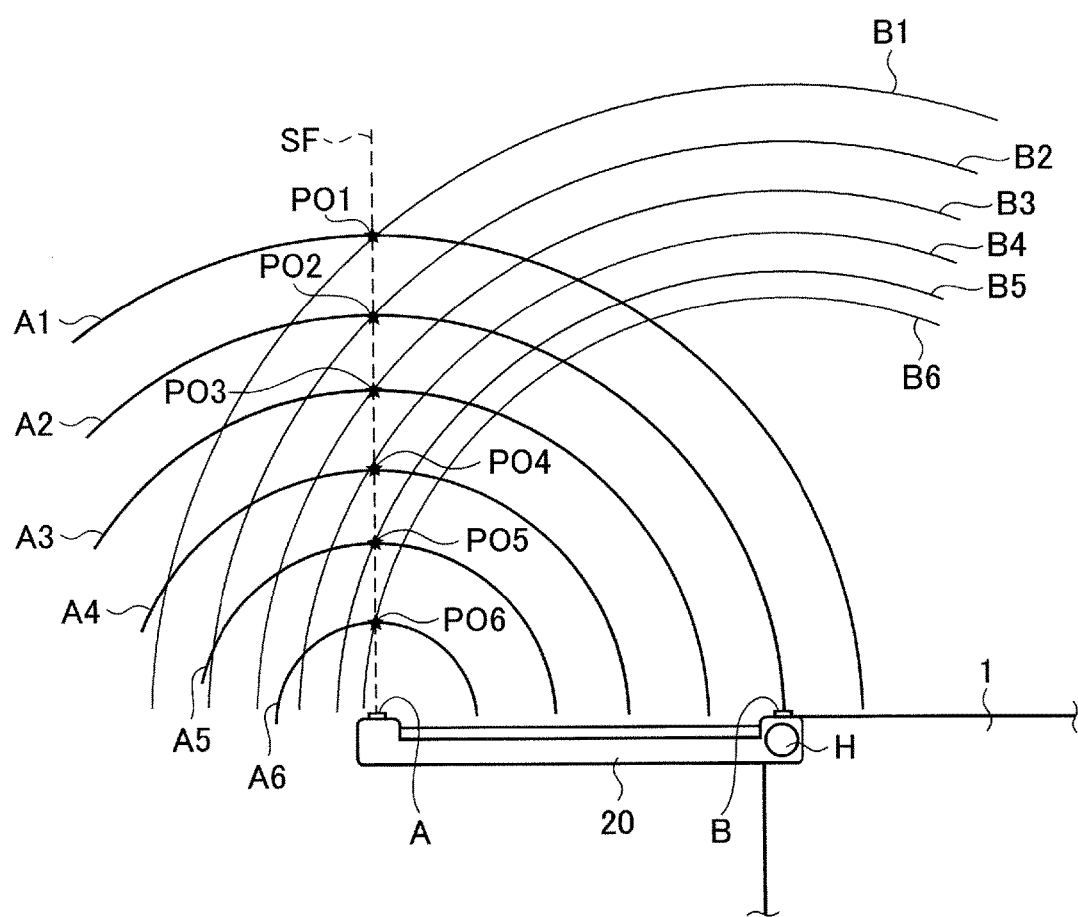
FIG. 10 is a view schematically illustrating the detectable range of the antennas A and B when manipulation panel 20 is in a horizontal state.

FIG. 10 is a view schematically illustrating the detectable range of antennas A and B when manipulation panel 20 is in the horizontal state. In FIG. 10, curved lines A1 to A6 or B1 to B6 indicate boundary lines on each of which the distance detected by antenna A or B changes.

Referring to FIG. 10, each of antennas A and B placed in manipulation panel 20 detects the distance from the antenna to human body in a stepwise manner.

Antenna A (the antenna in front of the touch panel) can detect the distance to the human body at six stages of distances A1 to A6. In the case where the human body falls within a range distant from boundary line A1, antenna A does not detect the distance to the human body. In the case where the human body falls within a range of boundary line A1 to boundary line A2, antenna A detects the distance to the human body as distance A1. In the case where the human body falls within a range of boundary line A2 to boundary line A3, antenna A detects the distance to the human body as distance A2. In the case where the human body falls within a range of boundary line A3 to boundary line A4, antenna A detects the distance to the human body as distance A3. In the case where the human body falls within a range of boundary line A4 to boundary line A5, antenna A detects the distance to the human body as distance A4. In the case where the human body falls within a range of boundary line A5 to boundary line A6, antenna A detects the distance to the human body as distance A5. In the case where the human body is located within boundary line A6, antenna A detects the distance to the human body as distance A6. In this case, the detectable range of antenna A is located within boundary line A1.

Antenna B (the antenna at the back of the touch panel) can detect the distance to the human body at six stages of distances B1 to B6. In the case where the human body falls within a range distant from boundary line B1, antenna B does not detect the distance to the human body. In the case where the human body falls within a range of boundary line B1 to boundary line B2, antenna B detects the distance to the human body as distance B1. In the case where the human body falls within a range of boundary line B2 to boundary line B3, antenna B detects the distance to the human body as distance B2. In the case where the human body falls within a range of boundary line B3 to boundary line B4, antenna B detects the distance to the human body as distance B3. In the case where the human body falls within a range of boundary line B4 to boundary line B5, antenna B detects the distance to the human body as distance B4. In the case where the human body falls within a range of boundary line B5 to boundary line B6, antenna B detects the distance to the human body as distance B5. In the case where the human body is located within boundary line B6, antenna B detects the distance to the human body as distance B6. In this case, the detectable range of antenna B is located within boundary line B1. Distances A1 to A6 and B1 to B6 each can be set by the sensitivity of each of antennas A and B.

In the case where manipulation panel 20 is in the horizontal state, the detectable range of antenna A reaches the pathway (the left side in FIG. 10). Therefore, in the case where the range where the detectable range (in boundary line A1) of antenna A and the detectable range (in boundary line B1) of antenna B are added is set to the detection range of sensor 23, antenna A falsely detect the human body to release the power saving mode when the human body merely passes by copying machine 1.

In order to prevent the false detection of the antenna A, main controller 10 determines whether the human body approaches the detection range of sensor 23 based on a combination of the distances detected by antennas A and B using the human body detecting distance table indicating a relationship between the distances detected by antennas A and B and the detection range of sensor 23. For example, the human body detecting distance table is stored in ROM 12.

FIG. 11 is a view schematically illustrating a first human body detecting distance table.

Referring to FIGS. 10 and 11, the human body detecting distance table illustrates the relationship between the distances detected by antennas A and B and the detection range. Specifically, the human body detecting distance table illustrates whether crossing points of boundary lines A1 to A6 having variable distances detected by antenna A and boundary lines B1 to B6 having variable distances detected by antenna B fall within the detection range, respectively. According to the human body detecting distance table, a line SF connecting a crossing point PO1 of boundary line A1 and boundary line B1, a crossing point PO2 of boundary line A2 and boundary line B2, a crossing point PO3 of boundary line A3 and boundary line B3, a crossing point PO4 of boundary line A4 and boundary line B4, a crossing point PO5 of boundary line A5 and boundary line B5, and a crossing point PO6 of boundary line A6 and boundary line B6 is a boundary of the detection range of sensor 23. An area located on the main body side of copying machine 1 (apparatus body side) of line SF is the detection range of sensor 23. In the case where the position of the human body reaches any one of crossing points PO1 to PO6 based on the detection results of antennas A and B, main controller 10 determines that the human body approaches the detection range, and releases the power saving mode. On the other hand, an area located on the pathway side of the line SF is the outside of the detection range of sensor 23. In the case where the position of the human body does not reach any crossing points PO1 to PO6 based on the detection results of antennas A and B, main controller 10 does not release the power saving mode even if antenna A or B can detect the distance to the human body.

For example, in the case where the distance detected by antenna A becomes distance A2 while the distance detected by antenna B becomes distance B2, main controller 10 detects that the human body approaches the detection range of sensor 23, and returns the operating state of copying machine 1 from the power saving mode to the normal mode. On the other hand, in the case where the distance detected by antenna A becomes distance A2 while the distance detected by antenna B becomes distance B1, main controller 10 does not detect that the human body approaches the detection range of sensor 23, and maintains the operating state of copying machine 1 in the power saving mode.

In the case where manipulation panel 20 is in the horizontal state, preferably line SF is set in a plane that extends toward a vertical direction from the lower portion (in FIG. 10, an end portion on the outer periphery side of copying machine 1, and a portion projecting toward the pathway side of manipulation panel 20) of manipulation panel 20 as illustrated in FIG. 10. Therefore, the detection range can be set onto the main body side of copying machine 1 of the plane. In the case where manipulation panel 20 is in the horizontal state, the human body detecting distance table is prepared such that an area on the main body side of copying machine 1 of the portion projecting toward the pathway side of manipulation panel 20 becomes the detection distance of sensor 23, allowing the prevention of the false detection of antenna A placed in the portion projecting toward the pathway side of manipulation panel 20.

The human body detecting distance table may be set more finely by finely dividing the detection distance of antenna A or B.

Figure 12:
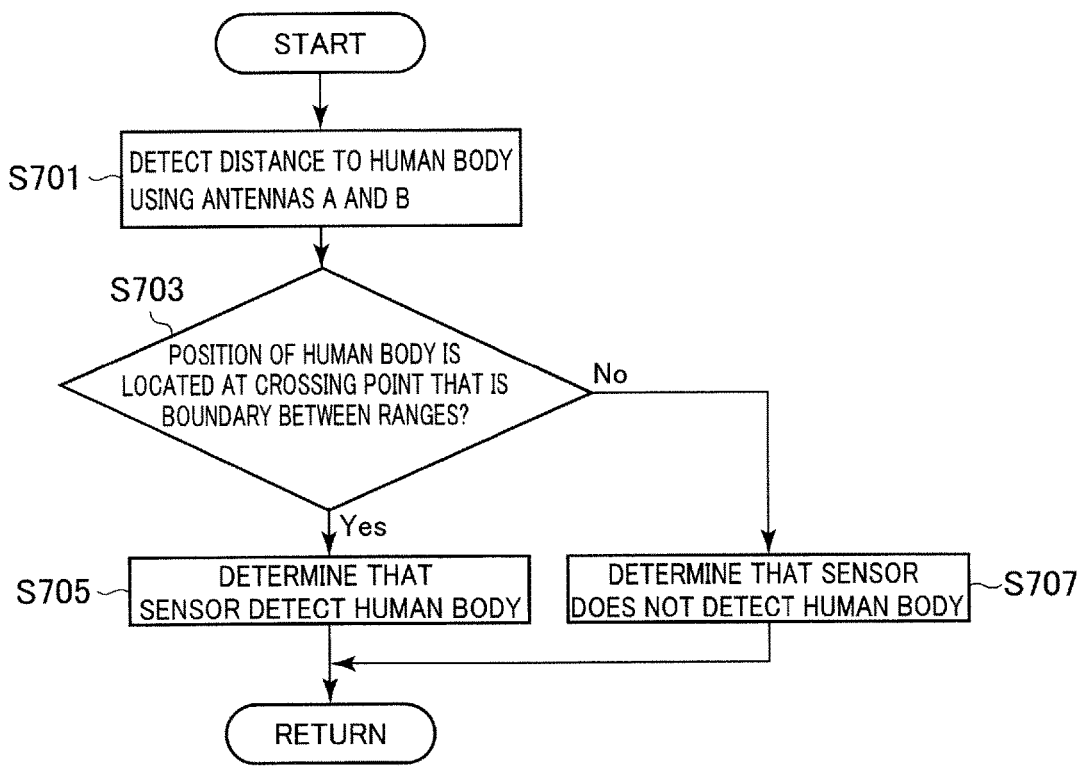
FIG. 12 is a view of a subroutine of processing in S506 in FIG. 5.

FIG. 12 is a view of a subroutine of the processing in S506 in FIG. 5.

Referring to FIG. 12, in the processing of monitoring sensor 23 (S506), main controller 10 detects the distance to the human body using antennas A and B (S701). By use of the human body detecting distance table, main controller 10 determines whether the position of the human body is located at the crossing point that is the boundary between the detection ranges of sensor 23 based on the detection results of antennas A and B (S703).

When it is decided that the position of the human body is located at the crossing point (Yes in S703), main controller 10 determines that sensor 23 detects the human body (S705), and main controller 10 returns to the main routine. On the other hand, when it is decided that the position of the human body is not located at the crossing point (No in S703), main controller 10 determines that sensor 23 does not detect the human body (S707), and main controller 10 returns to the main routine.

The method for setting the position or the detectable range of each antenna is not limited to the present embodiment. The detection range of sensor 23 may arbitrarily be set, but the detection range is not limited to the area on the main body side of copying machine 1 of the portion projecting toward the pathway side of manipulation panel 20.

As described above, the angle information on manipulation panel 20 and the detection information of the human body sensor are combined to determine whether the power saving mode is released, so that the false release of the power saving mode can be prevented in the case where a person who has no intention to release the power saving mode approaches copying machine 1.

[First Modification]

In the above embodiment, only one human body detecting distance table is stored in ROM 12. The case where a plurality of human body detecting distance tables are stored in ROM 12 will be described in a first modification.

FIG. 13 is a view schematically illustrating a second human body detecting distance table.

Referring to FIG. 13, the second human body detecting distance table differs from the human body detecting distance table in FIG. 11 in that crossing point PO1 of boundary line A1 and boundary line B1, crossing point PO2 of boundary line A2 and boundary line B2, crossing point PO3 of boundary line A3 and boundary line B3, crossing point PO4 of boundary line A4 and boundary line B4, crossing point PO5 of boundary line A5 and boundary line B5, and crossing point PO6 of boundary line A6 and boundary line B6 are each located out of the detection range of sensor 23.

The human body detecting distance table in FIG. 11 and the human body detecting distance table in FIG. 13 are stored in ROM 12. For example, in the processing in S504 in FIG. 5, main controller 10 selects the human body detecting distance table used to detect the human body using sensor 23 from the tables stored in ROM 12 based on angle θ of manipulation panel 20. Specifically, main controller 10 selects the human body detecting distance table in FIG. 11 in the case where manipulation panel 20 has angle θ of 0 degree (manipulation panel 20 is in the horizontal state), and main controller 10 selects the human body detecting distance table in FIG. 13 in the case where manipulation panel 20 does not have angle θ of 0 degree. In this case, the human body detecting distance table in FIG. 11 is the table for the case where manipulation panel 20 is in the horizontal state.

Any number of human body detecting distance tables may be stored in ROM 12, and at least three human body detecting distance tables may be stored in ROM 12. The human body detecting distance table that is selected in the case where manipulation panel 20 does not have angle θ of 0 degree may be one except the human body detecting distance table in FIG. 13.

[Second Modification]

In the above embodiment, antennas A and B detect the distance to the human body in the stepwise manner. The case where antennas A and B continuously detect the distance to the human body will be described in a second modification.

FIG. 14 is a view schematically illustrating a third human body detecting distance table.

Referring to FIG. 14, the third human body detecting distance table may be used in the case where antennas A and B continuously detect the distance to the human body. The third human body detecting distance table illustrates whether a combination of the range including the distance to the human body detected by antenna A and the range including the distance to the human body detected by antenna B falls within the detection range. The range of the distance detected by antenna A is divided into three ranges: a range of distances D1 and D2, a range of distances D2 and D3, and a range of distances D3 and D4. The range of distance detected by antenna B is divided into three ranges: a range of distances D11 and D12, a range of distances D12 and D13, and a range of distances D13 and D14.

In the third human body detecting distance table, for example, in the case where the distance detected by antenna B falls within the range of distances D12 to D14 while the distance detected by antenna A falls within the range of distances D2 to D3, main controller 10 determines that the human body approaches the detection range, and releases the power saving mode. On the other hand, for example, in the case where the distance detected by antenna B falls within the range of distances D11 and D12 while the distance detected by antenna A falls within the range of distances D2 to D3, main controller 10 determines that the human body does not approach the detection range, and does not release the power saving mode.

[Third Modification]

The case where the detection range of sensor 23 is set based on the existence or non-existence of the output to the sheet discharge unit of copying machine 1 or the existence or non-existence of the placement of the authentication device in copying machine 1 will be described in a third modification.

Figure 15:
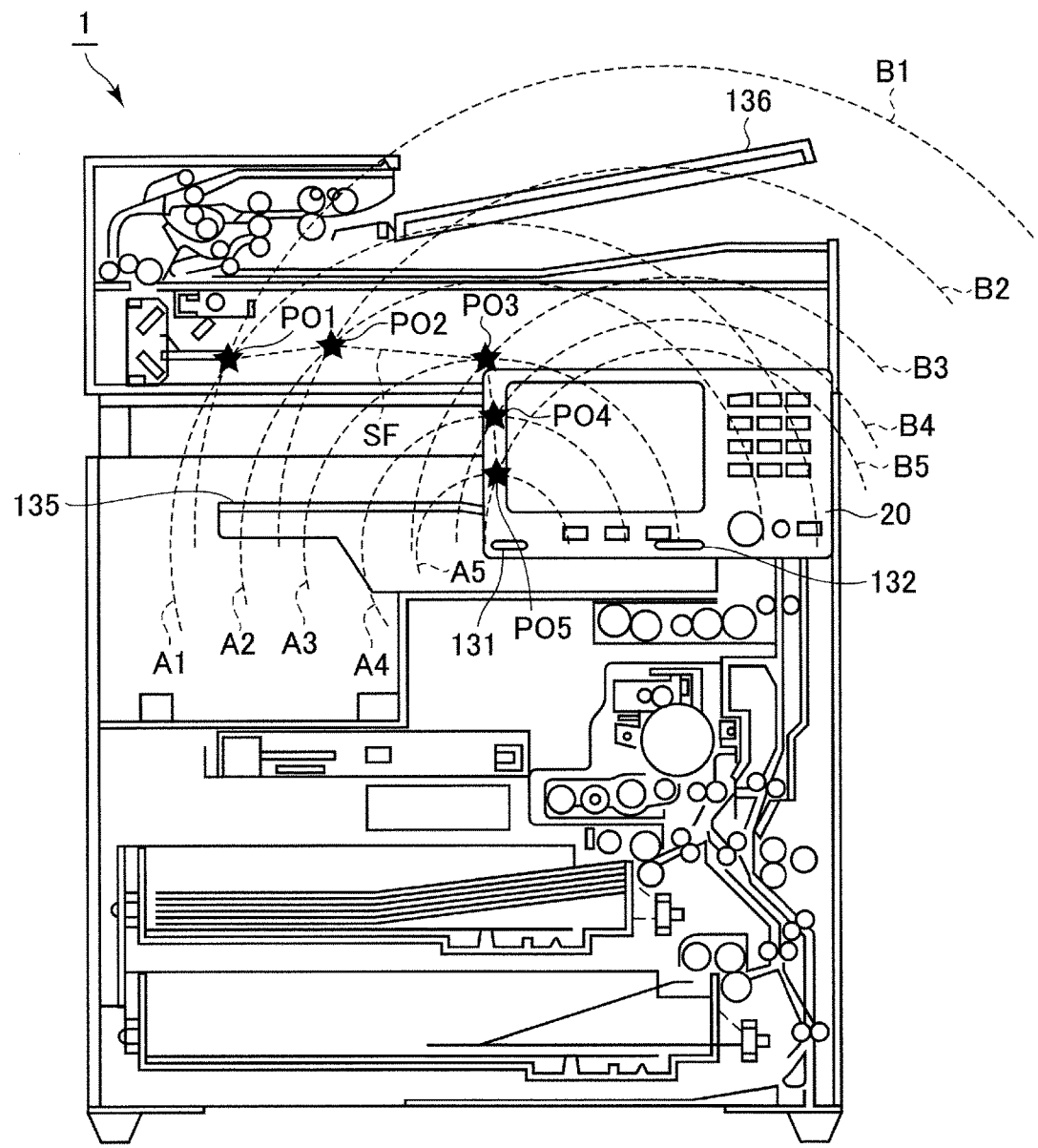
FIG. 15 is a view schematically illustrating a relationship between a sheet discharge unit 135 and detectable ranges of antennas 131 and 132.

FIG. 15 is a view schematically illustrating a relationship between sheet discharge unit 135 and the detectable ranges of antennas 131 and 132.

Referring to FIG. 15, copying machine 1 includes sheet discharge unit 135 that is disposed in the central portion thereof. The output (sheet on which the image is printed) is discharged from the main body of copying machine 1 to sheet discharge unit 135. Angle θ of manipulation panel 20 can be changed. FIG. 15 illustrates the state in which manipulation panel 20 is in the perpendicular state (angle θ of 90 degrees). Sensor 23 includes a plurality of rod-shaped antennas 131 and 132 that are disposed at positions different from each other in manipulation panel 20. Antennas 131 and 132 are disposed at the outer periphery in the surface (the surface in FIG. 15) of manipulation panel 20. Antenna 131 extends in the horizontal direction in the lower left portion of manipulation panel 20 in FIG. 15. Antenna 132 extends in the horizontal direction in the lower portion of manipulation panel 20 in FIG. 15. Antenna 131 can detect the distance to the human body at five stages of distances A1 to A5. Antenna 132 can detect the distance to the human body at five stages of distances B1 to B5. Distances A1 to A5 and B1 to B5 can be set by the sensitivity of each of antennas 131 and 132.

It is assumed that the user collects the output from sheet discharge unit 135. In this case, when manipulation panel 20 is in a state except the horizontal state, particularly in the perpendicular state, antennas 131 and 132 approach sheet discharge unit 135. When the user collects the output, antenna 131 or 132 falsely detects an arm of the user who passes by the left side portion of manipulation panel 20 close to sheet discharge unit 135, resulting in a risk of releasing the power saving mode. On the other hand, when manipulation panel 20 is in the horizontal state, antennas 131 and 132 hardly generate the false detection because antennas 131 and 132 are far away from sheet discharge unit 135.

For example, in the case where the angle θ of manipulation panel 20 is in the state except the horizontal state while output sheet detector 80 detects that the output exists on sheet discharge unit 135, preferably main controller 10 selects the human body detecting distance table in which the left side portion of manipulation panel 20 close to sheet discharge unit 135 is out of the detection range of sensor 23. Therefore, the false detection of the arm of the user who collects the output can be prevented.

FIG. 16 is a view schematically illustrating a fourth human body detecting distance table.

Referring to FIGS. 15 and 16, for example, main controller 10 selects the fourth human body detecting distance table in the case where the angle θ of manipulation panel 20 is in the state except the horizontal state while output sheet detector 80 detects that the output exists on sheet discharge unit 135. The fourth human body detecting distance table illustrates whether the crossing point of each of boundary lines A1 to A5 having the variable distance detected by antenna 131 and each of boundary lines B1 to B5 having the variable distance detected by antenna 132 falls within the detection range. According to the fourth human body detecting distance table, line SF connecting crossing point PO1 of boundary line A1 and boundary line B1, crossing point PO2 of boundary line A2 and boundary line B2, crossing point PO3 of boundary line A3 and boundary line B3, crossing point PO4 of boundary line A4 and boundary line B4, and crossing point PO5 of boundary line A5 and boundary line B5 is the boundary of the detection range of sensor 23. The area on the side (the upper right side in FIG. 15) that is far away from sheet discharge unit 135 with respect to line SF is in the detection range of sensor 23. In the case where the position of the human body reaches any one of crossing points PO1 to PO5 based on the detection results of antennas 131 and 132, main controller 10 determines that the human body approaches the detection range, and releases the power saving mode. On the other hand, the area on the side (the left side portion of manipulation panel 20 close to sheet discharge unit 135) close to sheet discharge unit 135 with respect to line SF is out of the detection range of sensor 23. In the case where the position of the human body does not reach any crossing points PO1 to PO5 based on the detection results of antennas 131 and 132, main controller 10 does not release the power saving mode even if antenna 131 or 132 can detect the distance to the human body.

When the whole left side portion of manipulation panel 20 is out of the detection range of sensor 23, the position at which antenna 131 or 132 detects the human body and the position at which antenna 131 or 132 does not detect the human body are mixed to possibly lose a manipulation feeling of the user in the case where the user manipulates the neighborhood of an ADF (Auto Document Feeder) unit 136. Therefore, in the fourth human body detecting distance table, an upper side portion of manipulation panel 20 close to ADF unit 136 becomes the detection range. Accordingly, antenna 131 or 132 detects the human body in the case where the user manipulates the neighborhood of ADF unit 136.

The human body detecting distance table may be set more finely by finely dividing the detection distance of antenna 131 or 132. The human body detecting distance table in FIG. 16 may be used irrespective of angle θ of manipulation panel 20 in the case where the output exists on sheet discharge unit 135 of copying machine 1.

Figure 17:
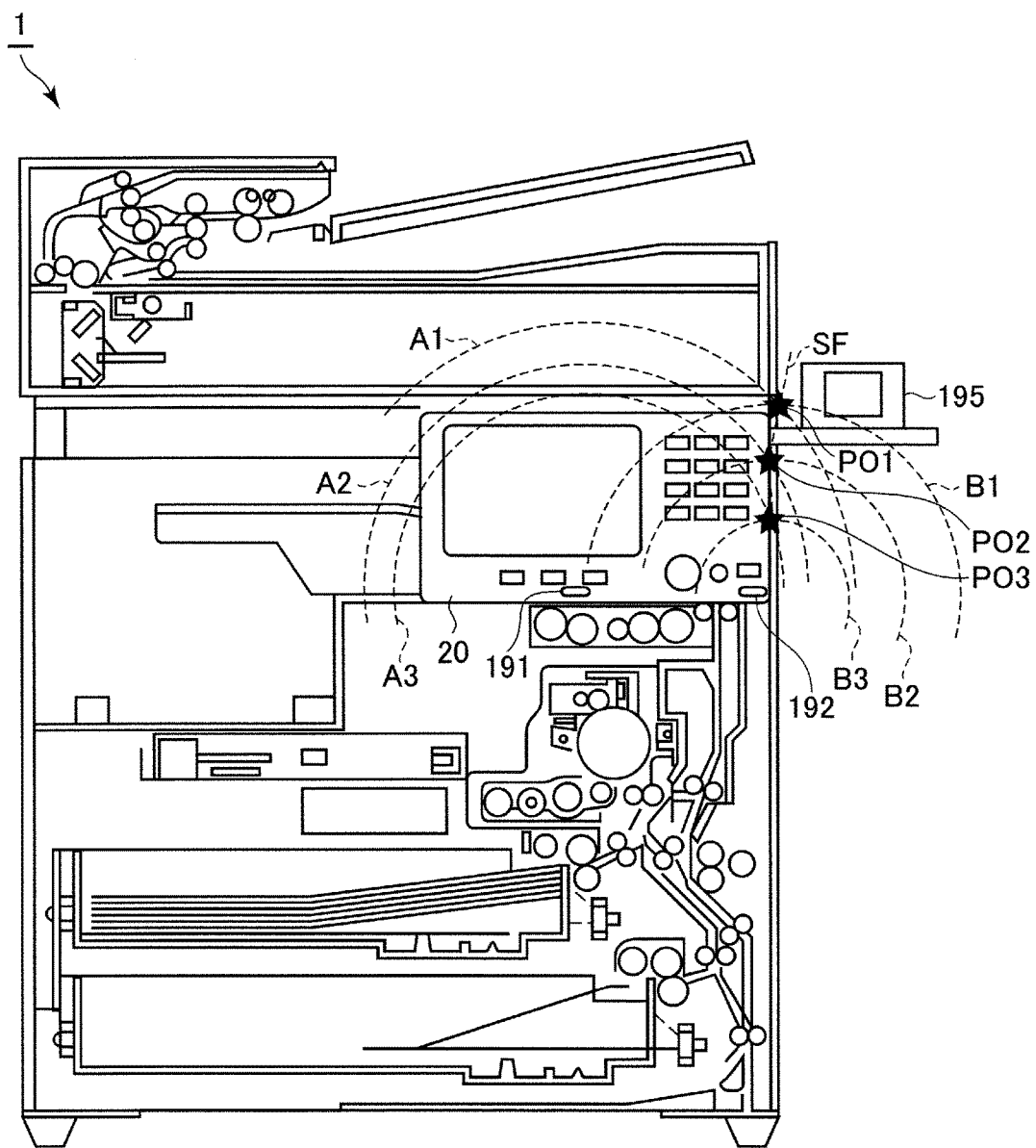
FIG. 17 is a view schematically illustrating a relationship between an authentication device 195 and detectable ranges of antennas 191 and 192.

FIG. 17 is a view schematically illustrating a relationship between authentication device 195 and the detectable ranges of antennas 191 and 192.

Referring to FIG. 17, copying machine 1 includes authentication device 195 disposed in a right end portion in FIG.

17. Authentication device 195 authenticates the user who uses copying machine 1. Sensor 23 includes a plurality of rod-shaped antennas 191 and 192 disposed at positions different from each other in manipulation panel 20. Antennas 191 and 192 are disposed at the outer periphery in the surface (the surface in FIG. 17) of manipulation panel 20. Antenna 191 extends in the horizontal direction in the lower portion of manipulation panel 20 in FIG. 17. Antenna 192 extends in the horizontal direction in the lower portion of manipulation panel 20 in FIG. 17. Antenna 191 can detect the distance to the human body at three stages of distances A1 to A3. Antenna 192 can detect the distance to the human body at three stages of distances B1 to B3. Distances A1 to A3 and B1 to B3 can be set by the sensitivity of each of antennas 191 and 192.

In the case where authentication device 195 is placed in copying machine 1, it is necessary for the user to perform an authentication manipulation using authentication device 195 before copying machine 1 is manipulated. When the user performs the authentication manipulation, antenna 191 or 192 falsely detects the arm of the user who passes by the right side portion of manipulation panel 20 close to authentication device 195, resulting in the risk of releasing the power saving mode.

Accordingly, in the case where authentication device detector 90 detects that authentication device 195 is placed, preferably main controller 10 selects the human body detecting distance table in which the right side portion of manipulation panel 20 close to authentication device 195 is out of the detection range of sensor 23. Therefore, the false detection of the arm of the user who performs the authentication manipulation can be prevented.

FIG. 18 is a view schematically illustrating a fifth human body detecting distance table.

Referring to FIGS. 17 and 18, main controller 10 selects the fifth human body detecting distance table in the case where authentication device detector 90 detects that authentication device 195 is placed. The fifth human body detecting distance table illustrates whether the crossing point of each of boundary lines A1 to A3 having the variable distance detected by antenna 191 and each of boundary lines B1 to B3 having the variable distance detected by antenna 192 falls within the detection range. According to the fifth human body detecting distance table, line SF connecting crossing point PO1 of boundary line A1 and boundary line B1, crossing point PO2 of boundary line A2 and boundary line B2, and crossing point PO3 of boundary line A3 and boundary line B3 is the boundary of the detection range of sensor 23. The area on the side (the left side in FIG. 17) that is far away from authentication device 195 with respect to line SF is in the detection range of sensor 23. In the case where the position of the human body reaches any one of crossing points PO1 to PO3 based on the detection results of antennas 191 and 192, main controller 10 determines that the human body approaches the detection range, and releases the power saving mode. On the other hand, the area on the side (the right side portion of manipulation panel 20 close to authentication device 195) close to authentication device 195 with respect to line SF is out of the detection range of sensor 23. In the case where the position of the human body does not reach any crossing points PO1 to PO3 based on the detection results of antennas 191 and 192, main controller 10 does not release the power saving mode even if antenna 191 or 192 can detect the distance to the human body.

The human body detecting distance table may be set more finely by finely dividing the detection distance of antenna 191 or 192.

As described above, the position at which the antenna is placed or the detection range of sensor 23 is set based on the existence or non-existence of the output to sheet discharge unit 135 of copying machine 1 or the existence or non-existence of the placement of authentication device 195 in copying machine 1. Therefore, in the case where a person who has no intention to release the power saving mode approaches manipulation panel 20, the false detection of the human body of the person can be prevented, and the unnecessary release of the power saving mode can be prevented.

Figure 19:
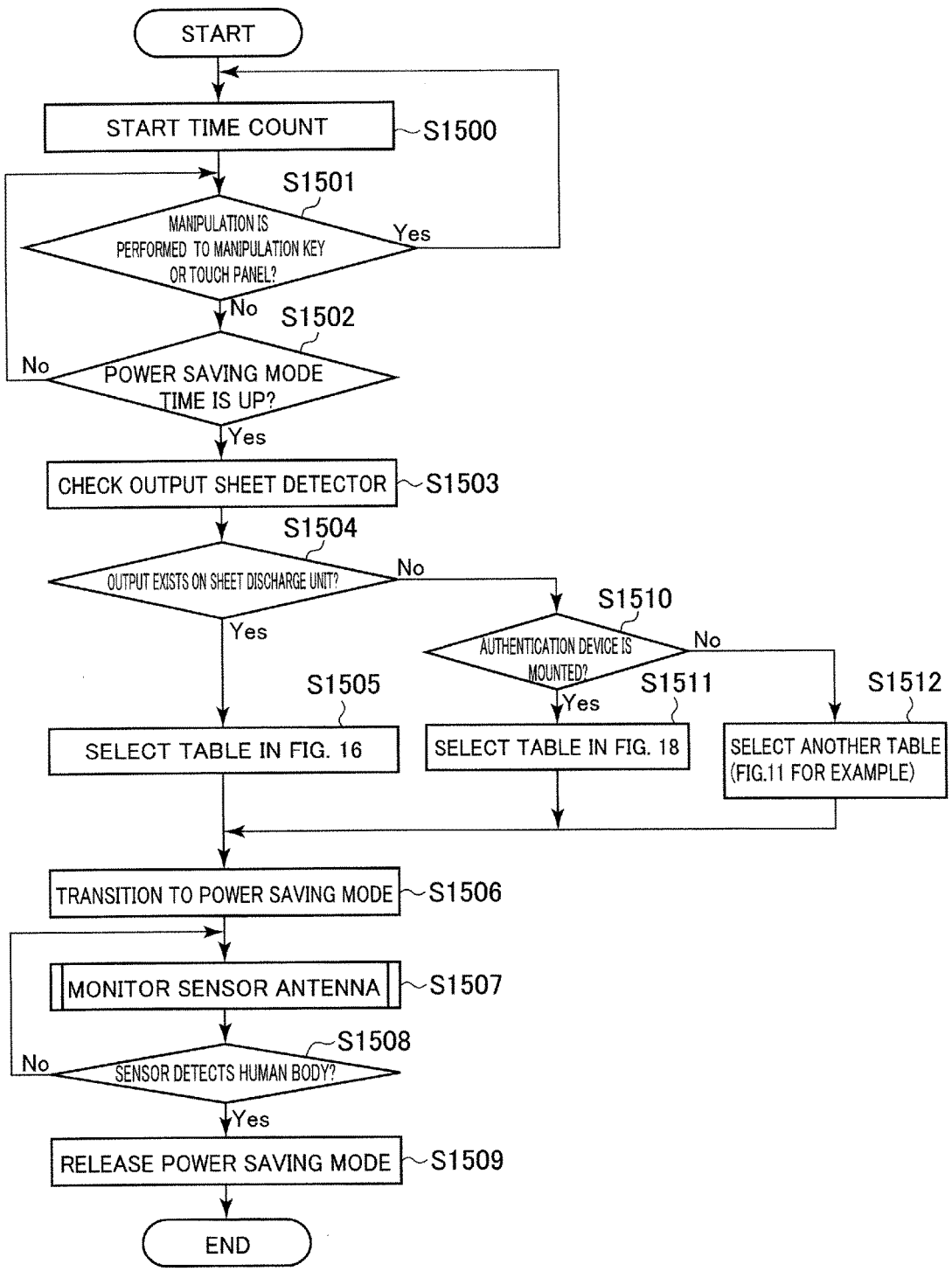
FIG. 19 is a control flowchart of the transition to the power saving mode and the return from the power saving mode in a fourth modification of the present invention.

FIG. 19 is a control flowchart of the transition to the power saving mode and the return from the power saving mode in a fourth modification of the present invention.

Referring to FIG. 19, after the normal mode is started up, main controller 10 starts the time count of the time necessary to transition to the previously-set power saving mode (S1500), and main controller 10 determines whether the manipulation is performed to various manipulation keys 24 or touch panel 25 of manipulation panel 20 (S1501).

When it is determined that the manipulation is performed (Yes in S1501), main controller 10 proceeds to the processing in S1500. On the other hand, when it is determined that the manipulation is not performed (No in S1501), main controller 10 determines whether the time necessary to transition to the power saving mode is up (S1502).

When it is determined that the time necessary to transition to the power saving mode is up (Yes in S1502), main controller 10 checks the detection state of output sheet detector 80 (S1503), and main controller 10 determines whether the output exists on sheet discharge unit 135 (S1504).

When it is determined that the output exists on sheet discharge unit 135 (Yes in S1504), main controller 10 selects the fourth human body detecting distance table in FIG. 16 (S1505), and main controller 10 proceeds to processing in S1506. On the other hand, when it is determined that the output does not exist on sheet discharge unit 135 (No in S1504), main controller 10 checks the detection state of authentication device detector 90, and determines whether authentication device 195 is mounted on (placed in) copying machine 1 (S1510).

When it is determined that authentication device 195 is mounted (Yes in S1510), main controller 10 selects the fifth human body detecting distance table in FIG. 18 (S1511), and main controller 10 proceeds to the processing in S1506. On the other hand, when it is determined that authentication device 195 is not mounted (No in S1510), main controller 10 selects the first human body detecting distance table in FIG. 11 (S1512), and main controller 10 proceeds to the processing in S1506.

Main controller 10 controls power supply controller 30 to cause the operating state of copying machine 1 to transition to the power saving mode (S1506), and main controller 10 monitors sensor 23 (S1507). In S1507, for example, the subroutine in FIG. 12 may be performed. Subsequently, main controller 10 determines whether sensor 23 detects the human body (S1508).

When sensor 23 detects the human body (Yes in S1508), main controller 10 releases the power saving mode to return the operating state of copying machine 1 to the normal mode (S1509), and main controller 10 ends the processing. On the other hand, when sensor 23 does not detect the human body (No in S1508), main controller 10 proceeds to the processing in S1507.

Advantageous Effect of Embodiment

According to the above embodiment, the image forming apparatus that improves the reliability of the release of the power saving mode can be provided.

The above embodiment relates to the image forming apparatus that can release the power saving mode using the low-power-consumption semiconductor control sensor that performs proximity detection in the technology of releasing the power saving mode (energy saving mode). In the above embodiment, the energy saving releasing sensor is provided around the manipulation panel, and the detection range (non-contact position) where the release of the energy saving of the sensor is detected is changed according to the angle of the manipulation panel, the existence or non-existence of the output to the sheet discharge unit, and the existence or non-existence of the placement of the authentication device in the image forming apparatus. Therefore, the human body is hardly detected when the person merely stands in front of the apparatus. As a result, for example, in the case where the person who has no intention to release the power saving mode approaches the manipulation panel such that a person passes by in front of the image forming apparatus or such that a service person performs maintenance of the image forming apparatus, the false detection of the human body of the person can be prevented, and the reliability of the release of the power saving mode can be improved.

The sensitivity of each antenna is set based on the angle of the manipulation panel, allowing the detection range of the sensor to be easily set according to the state of the image forming apparatus.

Whether the human body approaches the detection range is determined using the table based on the distances detected by the two sensors, allowing the detection range of the sensor to be easily set using the table.

Furthermore, the detection range of the sensor can easily be set according to the state of the image forming apparatus by selecting the table to be used from the plurality of tables.

[Others]

In the above embodiment, the detection range may be set based on at least one of the angle of the manipulation panel of the image forming apparatus, the existence or non-existence of the output to the sheet discharge unit of the image forming apparatus, and the existence or non-existence of the placement of the authentication device in the image forming apparatus, and the sensitivity of the antenna may be invariable irrespective of the state of the image forming apparatus.

The above embodiment may be properly combined. For example, in the third modification, the sensitivity of the antenna may be set according to the existence or non-existence of the output sheet to the sheet discharge unit or the existence or non-existence of the placement of the authentication device.

The processing in the above embodiment may be performed by software or performed using a hardware circuit. A program that performs the processing in the above embodiment can be provided, or the program may be provided to the user while recorded in recording medium, such as a CD-ROM, a flexible disk, a hard disk, a ROM, a RAM, and a memory card. The program is executed by computers, such as the CPU. The program may be downloaded in the apparatus through communication lines, such as the Internet.

Although the preset invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus capable of changing an operating state between a normal mode and a power saving mode having power consumption lower than that of said normal mode,
    the image forming apparatus comprising:
        a hardware processor and a human body detector, the human body detector including first and second sensors configured to detect an approach of a human body when the operating state of said image forming apparatus is in the power saving mode;
    wherein the hardware processor is configured to:
        set a detection range based on at least one of an angle of a manipulation panel of said image forming apparatus, existence or non-existence of an output to a sheet discharge unit of said image forming apparatus, and existence or non-existence of placement of an authentication device in said image forming apparatus;
        return the operating state of said image forming apparatus from the power saving mode to the normal mode when said human body detector detects that the human body approaches said detection range, wherein
    the first and second sensors are placed at sites different from each other, the first and second sensors being capable of detecting a distance to said human body, and
    said image forming apparatus further setting unit includes a storage device in which a table is stored, the table indicating a relationship between the distance detected by each of said first and said second sensors, and said detection range, and
    the hardware processor is also configured to determine whether the human body approaches said detection range using said table based on said distance detected by each of said first and said second sensors.

2. The image forming apparatus according to claim 1, wherein each of said first and second sensors can detect the distance to the human body in a stepwise manner,
    said table indicates a crossing point of a boundary line on which the distance detected by said first sensor changes and a boundary line on which the distance detected by said second sensor changes, the crossing point becoming a boundary of said detection range, and
    the hardware processor determines that the human body approaches said detection range when a position of the human body based on the distance detected by each of said first and said second sensors reaches the crossing point becoming the boundary of said detection range based on said table.

3. The image forming apparatus according to claim 1, wherein
    a plurality of tables are stored as said table in said storage device, and
    the hardware processor is further configured to select the table used in said determination based on at least one of the angle of said manipulation panel, the existence or non-existence of the output to said sheet discharge unit, and the existence or non-existence of the placement of said authentication device.

4. The image forming apparatus according to claim 3, wherein the hardware processor is further configured to select the table for the case where a display surface of said manipulation panel is horizontal when the display surface of said manipulation panel is horizontal.

5. The image forming apparatus according to claim 3, wherein the hardware processor is further configured to select the table for the case where the output exists on said sheet discharge unit when the output exists on said sheet discharge unit.

6. The image forming apparatus according to claim 3, wherein the hardware processor is further configured to select the table for the case where said authentication device is placed when said authentication device is placed.

7. An image forming apparatus capable of changing an operating state between a normal mode and a power saving mode having power consumption lower than that of said normal mode,
the image forming apparatus comprising:
a hardware processor and a human body detector, the human body detector including first and second sensors configured to detect an approach of a human body when the operating state of said image forming apparatus is in the power saving mode;
wherein the hardware processor is configured to:
set a detection range based on at least one of an angle of a manipulation panel of said image forming apparatus, existence or non-existence of an output to a sheet discharge unit of said image forming apparatus, and existence or non-existence of placement of an authentication device in said image forming apparatus;
return the operating state of said image forming apparatus from the power saving mode to the normal mode when said human body detector detects that the human body approaches said detection range, wherein
the hardware processor is further configured to set said detection range onto said image forming apparatus side of a plane extending in a vertical direction from an end portion on an outer periphery of said image forming apparatus in said manipulation panel, when a display surface of said manipulation panel is horizontal.

8. An image forming apparatus capable of changing an operating state between a normal mode and a power saving mode having power consumption lower than that of said normal mode,
the image forming apparatus comprising:
a hardware processor and a human body detector, the human body detector including first and second sensors configured to detect an approach of a human body when the operating state of said image forming apparatus is in the Dower saving mode;
a manipulation panel that is adjustably mounted to the image forming apparatus such that an angle of the manipulation panel relative to the image forming apparatus is adjustable;
wherein the hardware processor is configured to:
set a detection range before the human body detector detects the approach of the human body, wherein the detection range is set based on at least one of the set angle of the manipulation panel relative to said image forming apparatus, existence or non-existence of an output to a sheet discharge unit of said image forming apparatus, and existence or non-existence of placement of an authentication device in said image forming apparatus; and
return the operating state of said image forming apparatus from the power saving mode to the normal mode when said human body detector detects that the human body approaches said detection range;
wherein the hardware processor is further configured to set:
a first detection range, when the manipulation panel has an angle of 0 degrees relative to the image forming apparatus;
a second detection range, when the manipulation panel has an angle of 90 degrees relative to the image forming apparatus;
a third detection range, when the manipulation panel has an angle from 1 to 44 degrees relative to the image forming apparatus; and
a fourth detection range, when the manipulation panel has an angle from 45 to 89 degrees relative to the image forming apparatus.

9. A method for controlling an image forming apparatus, being capable of changing an operating state between a normal mode and a power saving mode having power consumption lower than that of the normal mode, the image forming apparatus comprising a hardware processor, a human body detector, and a manipulation panel that is adjustably mounted to the image forming apparatus such that an angle of the manipulation panel relative to the image forming apparatus is adjustable;
the image forming apparatus controlling method comprising:
a human body detecting step performed by the human body detector of detecting an approach of a human body when the operating state of said image forming apparatus is in the power saving mode;
a setting step performed by the hardware processor of setting, a detection range, before the approach of the human body is detected, wherein the detection range, is set based on at least one of the set angle of the manipulation panel relative to said image forming apparatus, existence or non-existence of an output to a sheet discharge unit of said image forming apparatus, and existence or non-existence of placement of an authentication device in said image forming apparatus; and
a returning step performed by the hardware processor of returning said operating state of said image forming apparatus from said power saving mode to the normal mode when the approach of the human body to said detection range is detected in said human body detecting step performed by the hardware processor;
wherein the hardware processor further performs the setting steps to
set a first detection range when the manipulation panel has an angle of 0 degree relative to the image forming apparatus;
set a second detection range when the manipulation panel has an angle of 90 degrees relative to the image forming apparatus;
set a third detection range when the manipulation panel has an angle from 1 to 44 degrees relative to the image forming apparatus; and
set a fourth detection range when the manipulation panel has an angle from 45 to 89 degrees relative to the image forming apparatus.

10. A non-transitory, computer-readable recording medium storing a control program for an image forming apparatus, the image forming apparatus comprising a hardware processor, a human body detector, and a manipulation panel that is adjustably mounted to the image forming apparatus such that an angle of the manipulation panel relative to the image forming apparatus is adjustable; wherein said image forming apparatus can change an operating state between a normal mode and a power saving mode having power consumption lower than that of the normal mode, and said control program causes a computer to execute processing comprising:

a human body detecting step performed by the human body detector of detecting an approach of a human body when the operating state of said image forming apparatus is in the power saving mode;

a setting step performed by the hardware processor of setting a detection range, before the approach of the human body is detected, wherein the detection range is set based on at least one of the set angle of the manipulation panel relative to said image forming apparatus, existence or non-existence of an output to a sheet discharge unit of said image forming apparatus, and existence or non-existence of placement of an authentication device in said image forming apparatus; and a returning step performed by the hardware processor of returning the operating state of said image forming apparatus from the power saving mode to the normal mode when the approach of the human body to said detection range is detected in said human body detecting step;

wherein the hardware processor further performs the setting steps to:

set a first detection range when the manipulation panel has an angle of 0 degrees relative to the image forming apparatus;

set a second detection range when the manipulation panel has an angle of 90 degrees relative to the image forming apparatus;

set a third detection range when the manipulation panel has an angle from 1 to 44 degrees relative to the image forming apparatus; and set a fourth detection range when the manipulation panel has an angle from 45 to 89 degrees relative to the image forming apparatus.

* * * * *